United States Patent
Ballinger et al.

(10) Patent No.: US 9,495,127 B2
(45) Date of Patent: Nov. 15, 2016

(54) LANGUAGE MODEL SELECTION FOR SPEECH-TO-TEXT CONVERSION

(75) Inventors: Brandon M. Ballinger, Mountain View, CA (US);
(Continued)

(73) Assignee: Google Inc., Mountain View, CA (US)

( * ) Notice: Subject to any disclaimer, the term of this patent is extended or adjusted under 35 U.S.C. 154(b) by 167 days.

(21) Appl. No.: 12/976,920

(22) Filed: Dec. 22, 2010

(65) Prior Publication Data

US 2011/0153324 A1  Jun. 23, 2011

Related U.S. Application Data

(60) Provisional application No. 61/289,968, filed on Dec. 23, 2009, provisional application No. 61/330,219, filed on Apr. 30, 2010.

(51) Int. Cl.
*G10L 15/00* (2013.01)
*G06F 3/16* (2006.01)
(Continued)

(52) U.S. Cl.
CPC ........... *G06F 3/167* (2013.01); *G06F 3/04886* (2013.01); *G06F 17/277* (2013.01); *G06F 17/289* (2013.01);
(Continued)

(58) Field of Classification Search
CPC .................................. G10L 15/22; G10L 15/30
(Continued)

(56) References Cited

U.S. PATENT DOCUMENTS

| | | |
|---|---|---|
| 4,820,059 A | 4/1989 | Miller et al. |
| 5,267,345 A | 11/1993 | Brown et al. |

(Continued)

FOREIGN PATENT DOCUMENTS

| | | |
|---|---|---|
| DE | 100 45 020 | 5/2001 |
| WO | WO02/096070 | 11/2002 |
| WO | 2005/122143 | 12/2005 |

OTHER PUBLICATIONS

Frey, B., et al., "ALGONQUIN: Iterating Laplace's Method to Remove Multiple Types of Acoustic Distortion for Robust Speech Recognition", EUROSPEECH 2001 Scandinavia, 7th European Conference on Speech Communication and Technology, Aalborg, Denmark, Sep. 3-7, 2001, [online]. research.microsoft.com [retrieved on Nov. 23, 2010]. Retrieved from the Internet: <URL: http://research.microsoft.com/pubs/76516/2001-frey-eurospeech.pdf>, 4 pages.

(Continued)

*Primary Examiner* — Michael Ortiz Sanchez
(74) *Attorney, Agent, or Firm* — Fish & Richardson P.C.

(57) ABSTRACT

Methods, computer program products and systems are described for converting speech to text. Sound information is received at a computer server system from an electronic device, where the sound information is from a user of the electronic device. A context identifier indicates a context within which the user provided the sound information. The context identifier is used to select, from among multiple language models, a language model appropriate for the context. Speech in the sound information is converted to text using the selected language model. The text is provided for use by the electronic device.

21 Claims, 17 Drawing Sheets

(75) Inventors: Johan Schalkwyk, Scarsdale, NY (US);
Michael H. Cohen, Portola Valley, CA
(US); Cyril Georges Luc Allauzen,
Long Island City, NY (US)

(51) Int. Cl.

| | | |
|---|---|---|
| *G10L 15/183* | (2013.01) | |
| *G10L 15/26* | (2006.01) | |
| *G06F 17/28* | (2006.01) | |
| *G10L 15/30* | (2013.01) | |
| *G10L 15/18* | (2013.01) | |
| *G06F 3/0488* | (2013.01) | |
| *G06F 17/27* | (2006.01) | |
| *G10L 15/22* | (2006.01) | |
| *G10L 15/197* | (2013.01) | |

(52) U.S. Cl.
CPC .............. *G10L 15/005* (2013.01); *G10L 15/18*
(2013.01); *G10L 15/183* (2013.01); ***G10L
15/22* (2013.01); *G10L 15/26* (2013.01); *G10L
15/265* (2013.01); *G10L 15/30*** (2013.01);
*G10L 15/197* (2013.01); *G10L 2015/223*
(2013.01)

(58) Field of Classification Search
USPC ................ 704/231, 251, 246, 250, E15.003,
704/E15.019
See application file for complete search history.

(56) References Cited

U.S. PATENT DOCUMENTS

| | | | |
|---|---|---|---|
| 5,632,002 A | 5/1997 | Hashimoto et al. | |
| 5,638,487 A | 6/1997 | Chigier | |
| 5,715,367 A | 2/1998 | Gillick et al. | |
| 5,737,724 A | 4/1998 | Atal et al. | |
| 5,768,603 A | 6/1998 | Brown et al. | |
| 5,805,832 A | 9/1998 | Brown et al. | |
| 5,822,730 A | 10/1998 | Roth et al. | |
| 6,021,403 A | 2/2000 | Horvitz et al. | |
| 6,119,186 A | 9/2000 | Watts et al. | |
| 6,167,377 A | 12/2000 | Gillick et al. | |
| 6,182,038 B1* | 1/2001 | Balakrishnan et al. | ...... 704/250 |
| 6,317,712 B1 | 11/2001 | Kao et al. | |
| 6,356,866 B1 | 3/2002 | Pratley et al. | |
| 6,397,180 B1 | 5/2002 | Jaramillo et al. | |
| 6,418,431 B1 | 7/2002 | Mahajan et al. | |
| 6,430,551 B1* | 8/2002 | Thelen et al. | |
| 6,446,041 B1 | 9/2002 | Reynar et al. | |
| 6,539,358 B1 | 3/2003 | Coon et al. | |
| 6,581,033 B1 | 6/2003 | Reynar et al. | |
| 6,678,415 B1 | 1/2004 | Popat et al. | |
| 6,714,778 B2 | 3/2004 | Nykänen et al. | |
| 6,778,959 B1 | 8/2004 | Wu et al. | |
| 6,822,585 B1 | 11/2004 | Ni et al. | |
| 6,839,670 B1 | 1/2005 | Stammler et al. | |
| 6,851,115 B1 | 2/2005 | Cheyer et al. | |
| 6,876,966 B1 | 4/2005 | Deng et al. | |
| 6,912,499 B1 | 6/2005 | Sabourin et al. | |
| 6,922,669 B2 | 7/2005 | Schalk et al. | |
| 6,950,796 B2 | 9/2005 | Ma et al. | |
| 6,959,276 B2 | 10/2005 | Droppo et al. | |
| 6,985,147 B2 | 1/2006 | Asakawa et al. | |
| 7,027,987 B1 | 4/2006 | Franz et al. | |
| 7,043,422 B2 | 5/2006 | Gao et al. | |
| 7,107,204 B1 | 9/2006 | Liu et al. | |
| 7,149,688 B2 | 12/2006 | Schalkwyk | |
| 7,149,970 B1 | 12/2006 | Pratley et al. | |
| 7,174,288 B2 | 2/2007 | Ju et al. | |
| 7,200,550 B2 | 4/2007 | Menezes et al. | |
| 7,203,645 B2 | 4/2007 | Pokhariyal et al. | |
| 7,203,731 B1 | 4/2007 | Coates | |
| 7,257,532 B2 | 8/2007 | Toyama | |
| 7,310,601 B2 | 12/2007 | Nishizaki et al. | |
| 7,328,155 B2 | 2/2008 | Endo et al. | |
| 7,366,668 B1 | 4/2008 | Franz et al. | |
| 7,370,275 B2 | 5/2008 | Haluptzok et al. | |
| 7,383,553 B2 | 6/2008 | Atkin et al. | |
| 7,392,188 B2 | 6/2008 | Junkawitsch et al. | |
| 7,403,888 B1 | 7/2008 | Wang et al. | |
| 7,424,426 B2 | 9/2008 | Furui et al. | |
| 7,424,428 B2 | 9/2008 | Rose et al. | |
| 7,451,085 B2 | 11/2008 | Rose et al. | |
| 7,493,260 B2 | 2/2009 | Harb et al. | |
| 7,505,894 B2 | 3/2009 | Menezes et al. | |
| 7,526,431 B2 | 4/2009 | Roth et al. | |
| 7,577,562 B2 | 8/2009 | Menezes et al. | |
| 7,624,018 B2 | 11/2009 | Chambers et al. | |
| 7,634,720 B2 | 12/2009 | Haluptzok et al. | |
| 7,672,833 B2 | 3/2010 | Blume et al. | |
| 7,698,124 B2 | 4/2010 | Menezes et al. | |
| 7,698,136 B1 | 4/2010 | Nguyen et al. | |
| 7,752,046 B2 | 7/2010 | Bacchiani et al. | |
| 7,778,816 B2 | 8/2010 | Reynar | |
| 7,805,299 B2 | 9/2010 | Coifman | |
| 7,818,279 B2 | 10/2010 | Liu et al. | |
| 7,831,427 B2 | 11/2010 | Potter et al. | |
| 7,848,927 B2 | 12/2010 | Ohno et al. | |
| 7,849,080 B2 | 12/2010 | Chang et al. | |
| 7,856,351 B2 | 12/2010 | Yaman et al. | |
| 7,877,385 B2 | 1/2011 | Craswell et al. | |
| 7,881,936 B2 | 2/2011 | Longé et al. | |
| 7,890,326 B2 | 2/2011 | Strope et al. | |
| 7,907,705 B1 | 3/2011 | Huff et al. | |
| 7,921,107 B2 | 4/2011 | Chang et al. | |
| 7,941,189 B2 | 5/2011 | Miyauchi | |
| 7,953,692 B2 | 5/2011 | Bower et al. | |
| 7,996,220 B2 | 8/2011 | Rose et al. | |
| 8,001,130 B2 | 8/2011 | Wen et al. | |
| 8,005,680 B2* | 8/2011 | Kommer | ....................... 704/275 |
| 8,009,678 B2 | 8/2011 | Brooke | |
| 8,027,973 B2 | 9/2011 | Cao et al. | |
| 8,060,373 B2 | 11/2011 | Gibbon et al. | |
| 8,069,027 B2 | 11/2011 | Liu et al. | |
| 8,069,043 B2 | 11/2011 | Bacchiani et al. | |
| 8,073,692 B2 | 12/2011 | Ativanichayaphong et al. | |
| 8,156,129 B2 | 4/2012 | Zhou et al. | |
| 8,224,656 B2* | 7/2012 | Scholz et al. | ................. 704/276 |
| 8,620,667 B2 | 12/2013 | Andrew | |
| 8,670,987 B2* | 3/2014 | Bergl et al. | ..................... 704/275 |
| 8,775,154 B2* | 7/2014 | Clinchant | ......... G06F 17/30669 |
| | | | 704/10 |
| 8,813,060 B2 | 8/2014 | Tewari et al. | |
| 8,847,775 B2 | 9/2014 | Morin et al. | |
| 8,949,266 B2* | 2/2015 | Phillips et al. | ............... 707/769 |
| 2002/0062216 A1* | 5/2002 | Guenther et al. | .......... 704/270.1 |
| 2002/0087309 A1 | 7/2002 | Lee et al. | |
| 2002/0087314 A1 | 7/2002 | Fischer et al. | |
| 2002/0087325 A1* | 7/2002 | Lee | ....................... G06Q 30/06 |
| | | | 704/270.1 |
| 2002/0099818 A1 | 7/2002 | Russell et al. | |
| 2002/0111990 A1 | 8/2002 | Wood et al. | |
| 2003/0050778 A1 | 3/2003 | Nguyen et al. | |
| 2003/0149561 A1 | 8/2003 | Zhou | |
| 2003/0216919 A1 | 11/2003 | Roushar | |
| 2003/0236099 A1 | 12/2003 | Deisher et al. | |
| 2004/0024583 A1 | 2/2004 | Freeman | |
| 2004/0043758 A1 | 3/2004 | Sorvari et al. | |
| 2004/0049388 A1* | 3/2004 | Roth et al. | .................... 704/251 |
| 2004/0098571 A1 | 5/2004 | Falcon | |
| 2004/0138882 A1 | 7/2004 | Miyazawa | |
| 2004/0172258 A1 | 9/2004 | Dominach et al. | |
| 2004/0230420 A1 | 11/2004 | Kadambe et al. | |
| 2004/0243415 A1 | 12/2004 | Commarford et al. | |
| 2005/0005240 A1 | 1/2005 | Reynar et al. | |
| 2005/0060138 A1 | 3/2005 | Wang et al. | |
| 2005/0091037 A1 | 4/2005 | Haluptzok et al. | |
| 2005/0108017 A1 | 5/2005 | Esser et al. | |
| 2005/0114474 A1 | 5/2005 | Anderson et al. | |
| 2005/0187763 A1 | 8/2005 | Arun | |
| 2005/0193144 A1 | 9/2005 | Hassan et al. | |
| 2005/0203740 A1 | 9/2005 | Chambers et al. | |
| 2005/0216273 A1 | 9/2005 | Reding et al. | |

(56) References Cited

U.S. PATENT DOCUMENTS

| | | |
|---|---|---|
| 2005/0246325 A1 | 11/2005 | Pettinati et al. |
| 2005/0283364 A1* | 12/2005 | Longe et al. ............... 704/257 |
| 2006/0004572 A1 | 1/2006 | Ju et al. |
| 2006/0004850 A1 | 1/2006 | Chowdhury |
| 2006/0009974 A1 | 1/2006 | Junqua et al. |
| 2006/0035632 A1 | 2/2006 | Sorvari et al. |
| 2006/0048055 A1 | 3/2006 | Wu et al. |
| 2006/0095248 A1 | 5/2006 | Menezes et al. |
| 2006/0100876 A1* | 5/2006 | Nishizaki ............... G10L 15/32 704/257 |
| 2006/0111891 A1 | 5/2006 | Menezes et al. |
| 2006/0111892 A1 | 5/2006 | Menezes et al. |
| 2006/0111896 A1 | 5/2006 | Menezes et al. |
| 2006/0111907 A1 | 5/2006 | Mowatt et al. |
| 2006/0148520 A1 | 7/2006 | Baker et al. |
| 2006/0212288 A1 | 9/2006 | Sethy et al. |
| 2006/0217990 A1* | 9/2006 | Theimer et al. ............... 705/1 |
| 2006/0247915 A1 | 11/2006 | Bradford et al. |
| 2007/0060114 A1 | 3/2007 | Ramer et al. |
| 2007/0078822 A1* | 4/2007 | Cucerzan et al. ............... 707/3 |
| 2007/0106685 A1* | 5/2007 | Houh ............... G06F 17/30796 |
| 2007/0124507 A1 | 5/2007 | Gurram et al. |
| 2007/0156407 A1 | 7/2007 | Schedl |
| 2007/0174040 A1 | 7/2007 | Liu et al. |
| 2007/0214131 A1 | 9/2007 | Cucerzan et al. |
| 2007/0233488 A1 | 10/2007 | Carus et al. |
| 2007/0260972 A1 | 11/2007 | Anderl |
| 2008/0005067 A1 | 1/2008 | Dumais et al. |
| 2008/0027723 A1 | 1/2008 | Reding et al. |
| 2008/0091406 A1 | 4/2008 | Baldwin et al. |
| 2008/0091435 A1 | 4/2008 | Strope et al. |
| 2008/0091443 A1 | 4/2008 | Strope et al. |
| 2008/0131851 A1 | 6/2008 | Kanevsky et al. |
| 2008/0133228 A1 | 6/2008 | Rao |
| 2008/0155111 A1 | 6/2008 | Takeuchi et al. |
| 2008/0162138 A1 | 7/2008 | Gurram et al. |
| 2008/0188271 A1 | 8/2008 | Miyauchi |
| 2008/0215541 A1* | 9/2008 | Li ............... G06F 17/30864 |
| 2008/0221887 A1 | 9/2008 | Rose et al. |
| 2008/0221898 A1 | 9/2008 | Cerra et al. |
| 2008/0221902 A1 | 9/2008 | Cerra et al. |
| 2008/0228903 A1* | 9/2008 | Davies et al. ............... 709/221 |
| 2008/0301112 A1 | 12/2008 | Wu |
| 2008/0312910 A1 | 12/2008 | Zhang |
| 2009/0018829 A1 | 1/2009 | Kuperstein |
| 2009/0018833 A1 | 1/2009 | Kozat et al. |
| 2009/0030687 A1 | 1/2009 | Cerra et al. |
| 2009/0030696 A1 | 1/2009 | Cerra et al. |
| 2009/0055162 A1 | 2/2009 | Qian et al. |
| 2009/0063455 A1 | 3/2009 | Li et al. |
| 2009/0150160 A1 | 6/2009 | Mozer |
| 2009/0164216 A1 | 6/2009 | Chengalvarayan et al. |
| 2009/0170561 A1 | 7/2009 | Chou |
| 2009/0210214 A1 | 8/2009 | Qian et al. |
| 2009/0254346 A1 | 10/2009 | Moore et al. |
| 2009/0271177 A1 | 10/2009 | Menezes et al. |
| 2009/0271188 A1 | 10/2009 | Agapi et al. |
| 2009/0276219 A1 | 11/2009 | Yeh et al. |
| 2009/0287681 A1 | 11/2009 | Paek et al. |
| 2009/0287842 A1 | 11/2009 | Plamondon |
| 2009/0292529 A1 | 11/2009 | Bangalore et al. |
| 2009/0299745 A1* | 12/2009 | Kennewick et al. ......... 704/257 |
| 2010/0004930 A1 | 1/2010 | Strope et al. |
| 2010/0042400 A1* | 2/2010 | Block et al. ............... 704/9 |
| 2010/0049502 A1 | 2/2010 | Oppenheim et al. |
| 2010/0057687 A1 | 3/2010 | Shen et al. |
| 2010/0088303 A1 | 4/2010 | Chen et al. |
| 2010/0100377 A1 | 4/2010 | Madhavapeddi et al. |
| 2010/0106497 A1 | 4/2010 | Phillips |
| 2010/0111059 A1 | 5/2010 | Bappu et al. |
| 2010/0153219 A1 | 6/2010 | Mei et al. |
| 2010/0153370 A1 | 6/2010 | Gollapudi et al. |
| 2010/0179803 A1 | 7/2010 | Sawaf et al. |
| 2010/0211588 A1 | 8/2010 | Jiang et al. |
| 2010/0217581 A1 | 8/2010 | Hong |
| 2010/0254521 A1 | 10/2010 | Kriese et al. |
| 2010/0257171 A1 | 10/2010 | Shekhawat |
| 2010/0257478 A1 | 10/2010 | Longe et al. |
| 2010/0286979 A1 | 11/2010 | Zangvil et al. |
| 2010/0315266 A1* | 12/2010 | Gunawardana et al. ....... 341/22 |
| 2010/0318531 A1 | 12/2010 | Gao et al. |
| 2010/0325109 A1 | 12/2010 | Bai et al. |
| 2011/0004462 A1* | 1/2011 | Houghton ............... G10L 15/183 704/9 |
| 2011/0066577 A1 | 3/2011 | Van Gael et al. |
| 2011/0077943 A1 | 3/2011 | Miki et al. |
| 2011/0093265 A1 | 4/2011 | Stent et al. |
| 2011/0137653 A1 | 6/2011 | Ljolje et al. |
| 2011/0161072 A1 | 6/2011 | Terao et al. |
| 2011/0161081 A1 | 6/2011 | Ballinger et al. |
| 2011/0162035 A1 | 6/2011 | King et al. |
| 2011/0231183 A1 | 9/2011 | Yamamoto et al. |
| 2011/0238410 A1 | 9/2011 | Larcheveque et al. |
| 2011/0257974 A1 | 10/2011 | Kristjansson et al. |
| 2011/0288868 A1 | 11/2011 | Lloyd et al. |
| 2011/0295590 A1 | 12/2011 | Lloyd et al. |
| 2011/0295852 A1 | 12/2011 | Wang et al. |
| 2012/0022867 A1 | 1/2012 | Ballinger et al. |
| 2012/0022868 A1 | 1/2012 | LeBeau et al. |
| 2012/0060113 A1 | 3/2012 | Sejnoha et al. |
| 2012/0143611 A1 | 6/2012 | Qian et al. |
| 2012/0191745 A1 | 7/2012 | Velipasaoglu et al. |
| 2014/0173440 A1 | 6/2014 | Dal Mutto et al. |
| 2014/0324434 A1* | 10/2014 | Vozila ............... G10L 15/18 704/257 |

OTHER PUBLICATIONS

Kristjansson, T., et al., "Super-Human Multi-Talker Speech Recognition: The IBM 2006 Speech Separation Challenge System", INTERSPEECH 2006: ICSLP; Proceedings of the Ninth International Conference on Spoken Language Process, Sep. 17-21, 2006, Pittsburgh, Pennsylvania, USA, Bonn, ISCA, 2006, 4 pages.

Zweig, G., "New Methods for the Analysis of Repeated Utterances", INTERSPEECH 2009, 10th Annual Conference of the International Speech Communication Association, Brighton, United Kingdom, Sep. 6-10, 2009, 4 pages.

Zweig, G., et al., "Structured Models for Joint Decoding of Repeated Utterances", INTERSPEECH 2008, 9th Annual Conference of the International Speech Communication Association, Brisbane, Australia, Sep. 22-26, 2008, 4 pages.

Extended European Search Report, Application No. EP 10 165 480.4, dated Oct. 24, 2011, 68 pages.

Bocchieri et al. "Use of geographical meta-data in ASR language and acoustic models," Acoustics Speech and Signal Processing (ICASSP), 2010 IEEE International Conference on IEEE, Mar. 14, 2010, pp. 5118-5121.

Cao et al. "Context-aware query suggestion by mining click-through and session data," in Proceedings of the 14th ACM SIGKDD International Conference on Knowledge Discovery and Data Mining (KDD '08), ACM, 2008, 875-883.

Dhillon. "Co-clustering documents and words using bipartite spectral graph partitioning:" in Proceedings of the Seventh ACM SIGKDD International Conference on Knowledge Discovery and Data Mining, (KDD '01), ACM, New York, NY, 2001, 269-274.

"Japanese Input on Windows XP," available at http://blog.greggman.com/blog/japanese_input_on_windows_xp, Apr. 29, 2004, 11 pages.

Kurland. Re-ranking search results using language models of query-specific clusters, ACM, 2009, 12(4):437-460.

Lee et al. "Search Result Clustering Using Label Language Model," IJCNLP 2008, The Third International Joint Conference on Natural Language Processing, Jan. 7-12, 2008, Hyderabad, India, 6 pages.

Li et al. "Query—URL Bipartite Based Approach to Personalized Query Recommendation," Proceedings of the Twenty Third AAAI Conference on Artificial Intelligence, 2008, 6 pages.

(56) References Cited

OTHER PUBLICATIONS

Liu and Croft. "Cluster-based retrieval using language models:" in Proceedings of the 27th Annual International ACM SIGIR Conference on Research and Development in Information Retrieval, (SIGIR '04). ACM, New York, NY, 2004, 186-193.
Maguitman et al. "Algorithmic detection of semantic similarity," in Proceedings of the 14th International Conference on World Wide Web (WWW '05), ACM, 2005, 107-116.
Mohri et al. "Weighted Finite-State Transducers in Speech Recognition," Computer Speech & Language, 2002, 16(1):69-88.
Vertanen. "An Overview of Discriminative Training for Speech Recognition," Technical Report, 2004, from http://www.inference.phy.cam.ac.uk/kv227/papers/Discriminative_Training.pdf, 14 pages.
Xu et al. "Using social annotations to improve language model for information retrieval:" in Proceedings of the Sixteenth ACM Conference on Information and Knowledge Management, (CIKM '07). ACM, New York, NY, 2007, 1003-1006.
Zha et al. "Bipartite graph partitioning and data clustering:" in Proceedings of the Tenth International Conference on Information and Knowledge Management (CIKM '01), Henrique Paques et al. (Eds.). 2001, ACM, New York, NY, 25-32.
United States Office Action in U.S. Appl. No. 12/760,147, dated Nov. 23, 2011, 13 pages.
United States Office Action in U.S. Appl. No. 13/249,181, mailed Dec. 23, 2011, 23 pages.
United States Office Action in U.S. Appl. No. 13/249,181, dated Sep. 6, 2012, 26 pages.
United States Office Action in U.S. Appl. No. 13/249,172, mailed Dec. 29, 2011, 17 pages.
United States Office Action in U.S. Appl. No. 13/249,172, dated Jun. 29, 2012, 18 pages.
United States Office Action in U.S. Appl. No. 12/782,862, dated Nov. 30, 2011, 24 pages.
United States Office Action in U.S. Appl. No. 12/787,568, dated Nov. 12, 2011, 16 pages.
United States Office Action in U.S. Appl. No. 12/976,920, mailed Jan. 20, 2012, 17 pages.
United States Office Action in U.S. Appl. No. 13/249,175, mailed Jan. 10, 2012, 17 pages.
United States Office Action in U.S. Appl. No. 13/249,175, dated Aug. 13, 2012, 30 pages.
United States Office Action in U.S. Appl. No. 12/976,920, dated Nov. 2, 2012, 25 pages.
United States Office Action in U.S. Appl. No. 13/040,553, dated Jan. 10, 2012, 23 pages.
United States Office Action in U.S. Appl. No. 13/250,466, dated Dec. 29, 2011, 25 pages.
United States Office Action in U.S. Appl. No. 13/250,466, dated Jun. 5, 2012, 23 pages.
United States Office Action in U.S. Appl. No. 13/250,496, dated Dec. 13, 2011, 6 pages.
United States Office Action in U.S. Appl. No. 13/250,496, dated May 29, 2012, 18 pages.
United States Office Action in U.S. Appl. No. 13/077,106, dated Jun. 6, 2012, 20 pages.
United States Office Action in U.S. Appl. No. 13/249,180, mailed Dec. 27, 2011, 12 pages.
United States Office Action in U.S. Appl. No. 13/249,180, dated Jun. 22, 2012, 17 pages.
United States Office Action in U.S. Appl. No. 12/977,017, dated Sep. 26, 2012, 16 pages.
United States Office Action in U.S. Appl. No. 12/976,972, dated Jul. 13, 2012, 20 pages.
Authorized Officer H. Van Doremalen. International Search Report and Written Opinion in International Application No. PCT/US2012/021221, mailed Apr. 5, 2012, 11 pages.
Authorized Officer R. Poquet. International Search Report and Written Opinion in International Application No. PCT/US2011/037558, dated Jul. 29, 2011, 11 pages.
Authorized Officer R. Poquet. International Search Report and Written Opinion in International Application No. PCT/US2011/029407, dated Jun. 7, 2011, 10 pages.
Authorized Officer I. Barabasz. International Search Report and Written Opinion in International Application No. PCT/US2011/036984, dated Aug. 31, 2011, 13 pages.
Partial European Search Report in European Application No. 10165480.4, dated Apr. 28, 2011, 7 pages.
Chang et al. "A system for spoken query information retrieval on mobile devices." Speech and Audio Processing, IEEE Transactions on 10.8 (2002): 531-541.
Xu et al., "Cluster-based language models for distributed retrieval." Proceedings of the 22nd annual international ACM SIGIR conference on Research and development in information retrieval. ACM, 1999.
United States Office Action in U.S. Appl. No. 12/977,003, dated Mar. 27, 2014, 29 pages.
United States Office Action in U.S. Appl. No. 12/977,017, dated Apr. 15, 2013, 20 pages.
United States Office Action in U.S. Appl. No. 12/977,017, dated Oct. 7, 2013, 13 pages.
United States Office Action in U.S. Appl. No. 12/976,972, dated Mar. 5, 2013, 23 pages.
United States Office Action in U.S. Appl. No. 12/976,972, dated Nov. 5, 2013, 14 pages.
United States Office Action in U.S. Appl. No. 13/249,175, mailed Apr. 24, 2014, 29 pages.
United States Office Action in U.S. Appl. No. 13/249,180, dated Aug. 9, 2012, 22 pages.
United States Office Action in U.S. Appl. No. 13/249,181, dated Oct. 9, 2013, 37 pages.
United States Office Action in U.S. Appl. No. 12/977,017, dated Aug. 13, 2014, 21 pages.
United States Office Action in U.S. Appl. No. 12/976,972, dated Jul. 30, 2014, 18 pages.
United States Office Action in U.S. Appl. No. 13/249,181, dated Jul. 18, 2014, 30 pages.
Untited States Office Action in U.S. Appl. No. 12/977,003, dated Oct. 21, 2014, 14 pages.
United States Office Action in U.S. Appl. No. 13/249,180, mailed Nov. 28, 2014, 31 pages.
United States Office Action in Application U.S. Appl. No. 13/249,175, mailed Jan. 28, 2015, 30 pages.
Untited States Notice of Allowance in U.S. Appl. No. 12/977,003, dated Jan. 30, 2015, 9 pages.
United States Office Action in U.S. Appl. No. 14/299,837, dated Jan. 29, 2015, 30 pages.
Zha, Hongyuan, et al. "Bipartite graph partitioning and data clustering." Proceedings of the tenth international conference on Information and knowledge management. ACM, 2001.
Buchsbaum, Adam L., and Raffaele Giancarlo. "Algorithmic aspects in speech recognition: An introduction." Journal of Experimental Algorithmics (JEA) 2(1997): 1.
United States Office Action in U.S. Appl. No. 12/976,972, dated Jul. 10, 2015, 15 pages.
United States Office Action in U.S. Appl. No. 13/249,175, mailed Jul. 16, 2015, 24 pages.
United States Office Action in U.S. Appl. No. 13/249,180, mailed Jul. 6, 2015, 28 pages.
United States Office Action in U.S. Appl. No. 14/299,837, dated 07/34/2015, 8 pages.

* cited by examiner http:www.facebook.com/home.php#/search/?ref=search&q=bill%20byrne$init=quick       550

LANGUAGE MODEL SELECTION FOR SPEECH-TO-TEXT CONVERSION

CROSS REFERENCE TO RELATED APPLICATION

This application claims priority to pending U.S. Provisional Application Ser. No. 61/289,968, entitled "Multi-Modal Input on an Electronic Device", filed on Dec. 23, 2009, the entire contents of which are hereby incorporated herein by reference, and claims priority to pending U.S. Provisional Application Ser. No. 61/330,219, entitled "Multi-Modal Input on an Electronic Device", filed on Apr. 30, 2010, the entire contents of which are hereby incorporated herein by reference.

TECHNICAL FIELD

This document relates to systems and techniques for multi-modal input into an electronic device and conversion of spoken input to text.

BACKGROUND

Computer users employ a number of mechanisms to provide input to their computing devices. Keyboards are common input devices, and they typically include single-digit numbers (e.g., in a cellular telephone) each of the letters in the alphabet, and some characters (e.g., in Qwerty or Dvorak keyboards). On mobile devices, keyboards are frequently "virtual" in form, and are displayed on a touch screen of a device. Such keyboards may be made available to various different applications running on a device, using a program known as an Input Method Editor, or IME, so that the IME receives the user input and then passes it to whatever application is currently active on the device. An IME can also translate user input, such as when a user enters Roman characters in a written language like Pinyin, and the IME generates Chinese characters that correspond to the typed Pinyin. Where the Pinyin corresponds to multiple possible characters, the IME can display all such characters, the user can tap the intended character, and the IME can pass that character to the operating application.

Users of computer devices, and particularly of mobile computing devices, may be constrained in their use of a keyboard. For example, the keyboard itself may be constrained in size because mobile device displays are small, so that only a sub-set of relevant characters can be displayed or the keys may be too small to press accurately. Also, the user may be constrained, in that they cannot easily type on a keyboard while walking through a crowded airport or driving a car. In such situations, spoken input may be preferred over typed input. However, speech-to-text conversion or translation typically requires lots of computer processing power, and mobile devices typically do not have much processing power. Also, such conversion often requires a particular user to "train" the system so that it better understands the user's voice and speech patterns.

SUMMARY

This document describes systems and techniques for multi-modal input into an electronic device, including speech input. In one example, an IME that provides keyboard services to a device may also provide for spoken input to the device. Much of the IME services may be unchanged from an ordinary IME, but the IME may be augmented to provide for speech-to-text conversion. Specifically, the IME may take a user input in whatever form (e.g., typed, spoken, D Pad, etc.) and may convert it to a standard form for presentation to an active application (e.g., passing characters or other key presses). Applications may subscribe to the IME's services just as they would subscribe if the IME did not accept voice input, and the provision of such speech-to-text functionality can be transparent to the applications.

A user could choose when to provide typed input and when to provide spoken input to the IME. First, the user may be in an application that requires input, and may take an appropriate action to invoke the IME (e.g., pressing a particular button or soft key on the device, moving the device in a certain manner, and the like). A keyboard may be initially displayed on the user's device, and the user may take another appropriate action to indicate that he or she will provide speech input. For example, the user may press a microphone button on the virtual keyboard, or may make a swipe across the virtual keyboard or another action that is inconsistent with an intent to provide typed input in the virtual keyboard. At that point, the IME can begin "listening" to the device's microphone and after the user has spoken, may pass corresponding text to the application.

In these manners, certain implementations may provide one or more benefits. For example, speech-to-text functionality may be provided on a computing device relatively simply, while re-using other IME functionality (e.g., interfaces to applications on a device) that is needed for keyboard-based IME translation. Use of context-specific language models in the manners discussed above and below may also permit more accurate conversion of speech to text, regardless of whether the system is trained to a particular user. Such context-specificity may also be provided automatically and transparently for a user, and at a level of specificity that is most suited to a particular situation. For example, where a user is simply interacting with a web page, the language model for the page may be used, but if the user is interacting with a form on the page, a more specific language model that is directed to that form or a particular field on the form may be used (with lower weightings, but higher-than-normal weightings, applied to the page-specific model).

Particular manners of using public user activity, such as search activity, to build contextual language models may also result in the generation of accurate models in a convenient manner. Such data may be made available via natural user activity that is already occurring voluntarily by the users. Also, the activity may occur in large enough volumes to provide enough data needed to generate a complete and accurate model for many contexts, and in this case, for many web pages. The models may also be updated over time, because the public user activity occurs continuously over time, so that continuously up-to-date models may be provided to users seeking speech-to-text conversion services.

In general, in one aspect, methods, computer program products and systems are described for a multi-modal input-method editor. A request can be received from a user of an electronic device for an application-independent input method editor having written and spoken input capabilities. That the user intends to provide spoken input to the application-independent input method editor can be identified, and the spoken input can be received from the user. The spoken input can be input to an application executing on the electronic device. The spoken input can be provided to a remote server. The remote server includes a speech recognition system configured to recognize text based on the spoken input. Text can be received from the remote server, where the text represents the spoken input. The text can be provided to the application as user input.

In general, in one aspect, methods, computer program products and systems are described for converting speech to text. Sound information is received at a computer server system from an electronic device, where the sound information is from a user of the electronic device. A context identifier indicates a context within which the user provided the sound information. The context identifier is used to select, from among multiple language models, a language model appropriate for the context. Speech in the sound information is converted to text using the selected language model. The text is provided for use by the electronic device.

Implementations of the methods, computer program products and systems can include one or more of the following features. The context identifier can identify a field of a form in which input on the electronic device is received, which input corresponds to the sound information, and the selected language model can be biased toward terms that are frequently entered into fields like the identified field. The context identifier can identify a web page that was being presented by the electronic device when the sound information was input by the user, and the selected language model can be generated by analyzing textual content for the web page and pages related to the web page. The selected language model can be generated by analyzing textual content for queries to which the web page and pages that are related to the web page are responsive. Pages that are related to the web page can be selected by a clustering analysis on a graph having pages as nodes that are connected to each other by queries for which the pages are responsive. A web page can be determined to be responsive to a query if the web page is a top n ranked search result for the query in a set of ranked search results relevant to the query, wherein n is a predetermined integer (e.g., is in the top 10 ranked search results).

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes techniques and systems that may be used to provide speech-to-text conversion for a user of a computing device, such as a smartphone. In certain instances, the speech input may be handled in a manner similar to other input (e.g., typed input) using an application such as an IME, where the IME can be switched into modes depending on the manner that the user chooses to enter data. Where transformation of the input is needed, the input may in certain circumstances be transmitted (either in a raw or converted form) to a server system remote from the computing device that may be programmed to pass a transformed input back to the device, such as by providing text in response to receiving spoken inputs. The computing device may also provide the server system with meta data that is passed with, or at essentially the same time as, the spoken inputs, and the meta data may be used by the server system to identify a context in which the user is entering the spoken input. The server system may then use that meta data to identify a language model to be used and/or to build a language model on the fly, such as by dynamically applying particular weightings to different language models (which may each be derived from different input corpuses).

Figure 1A:
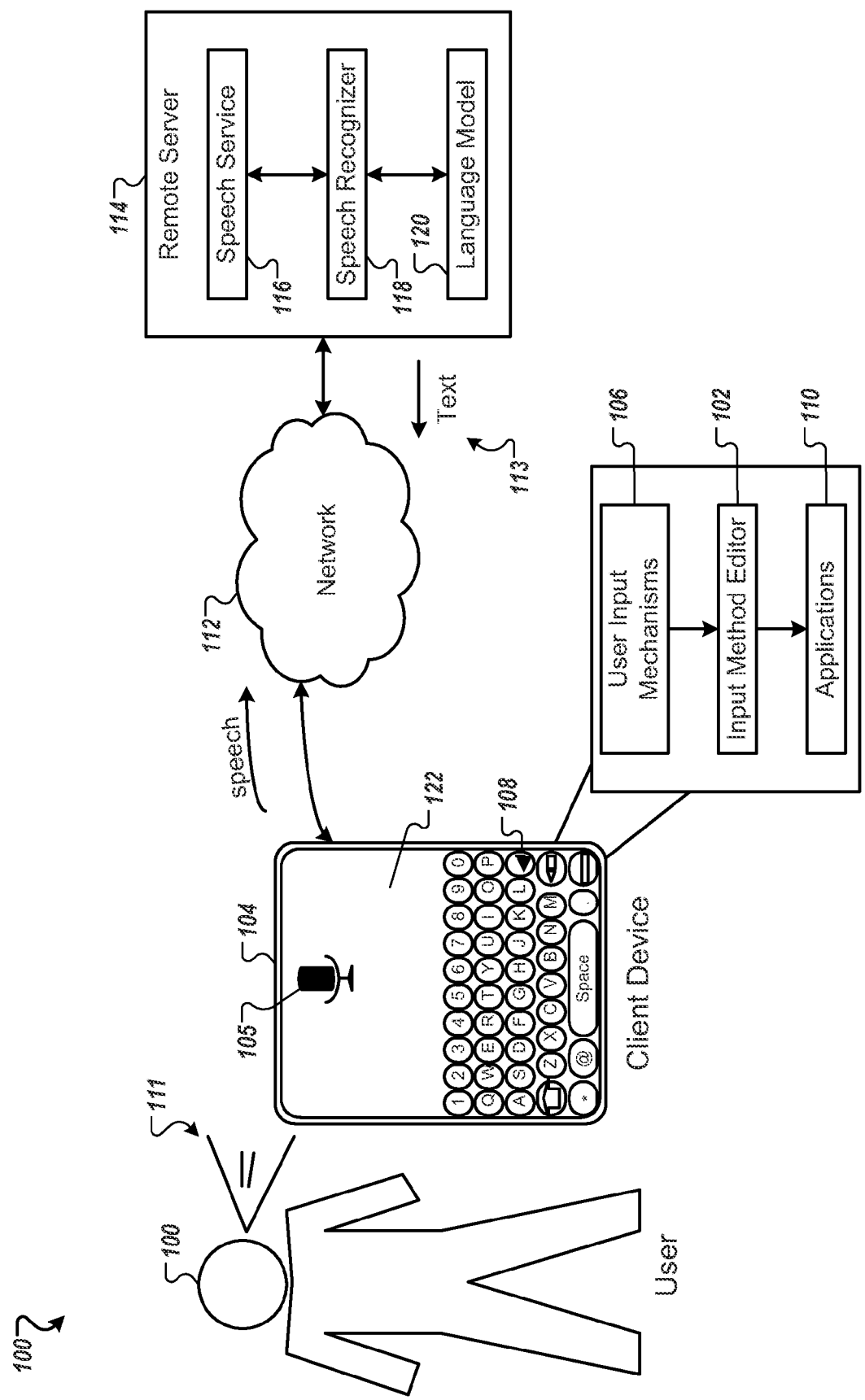
FIG. 1A is a conceptual diagram of an example system including a multi-modal input method editor.

FIG. 1A is a conceptual diagram of an example system 100 that includes a multi-modal input method editor (IME) 102. In this example, the IME 102 is implemented in a mobile electronic device 104, though it should be understood that the IME 102 can be implemented in a different electronic device, e.g., a PC, laptop computer, PDA, etc. The electronic device 104 includes multiple user input devices 106, including a microphone 105 to receive spoken user input. Other user input mechanisms include a keyboard, which can include a soft or virtual keyboard (e.g., a touch-screen keyboard 108) or a hard or physical keyboard, a mouse, a trackball, and the like. The user input mechanisms 106 are capable of receiving spoken input (i.e., by the microphone) and written input (i.e., by the keyboard 108).

The user input can be received by the electronic device 104 for use as input into one of various applications 110 that can execute on the electronic device 104, e.g., a web browser, an e-mail application, a word processing application, a contacts book, and/or a calendar. In some implementations, the user input is an input into a web form on a particular web page of a particular web site. The IME is generally application-independent, i.e., can be used for most any of the applications 110.

If the user input is spoken input, i.e., a speech utterance, the spoken input can be provided to a remote server for conversion to text. For example, the speech utterance 111 can be transmitted over the network 112 to a remote server 114 that includes a speech service 116 and speech recognizer system 118. The network 112 can include one or more local area networks (LANs), a wide area network (WAN), such as the Internet, a wireless network, such as a cellular network, or a combination of all of the above.

The speech recognizer system 118 can use one or more language models 120 to recognize text from the speech utterance. The text 113, which can be a selected best candidate or can be a list of n-best candidates that correspond to the speech utterance, is provided back to the electronic device 104 over the network 112. The text 113 can be displayed to the user on a display 122 of the electronic device 104.

If the text 113 includes a list of n-best candidates, the user 101 can select a candidate from the list that corresponds to the user's spoken input, for example, using the keyboard 108 or another input mechanism, such as touching the touch screen over one of the candidates, to navigate the list and make a selection.

The user can also provide written input, and can provide input using a combination of written and spoken input. For example, the user can begin a search query in a web browser by speaking one or more words and can then add to the query string by typing additional input using the keyboard 108. The IME 102 can provide the combined user input to the relevant application, i.e., the web browser application in this example. In some implementations, the language that the written input is written in can be determined and then provided as a language indicator to the remote server 114. The remote server 114 can use the language indicator when converting the speech utterance 111 to the text 113. For example, by knowing the language in which the speech is spoken, an appropriate language model 120 can be selected for use by the speech recognizer 118.

Figure 1B:
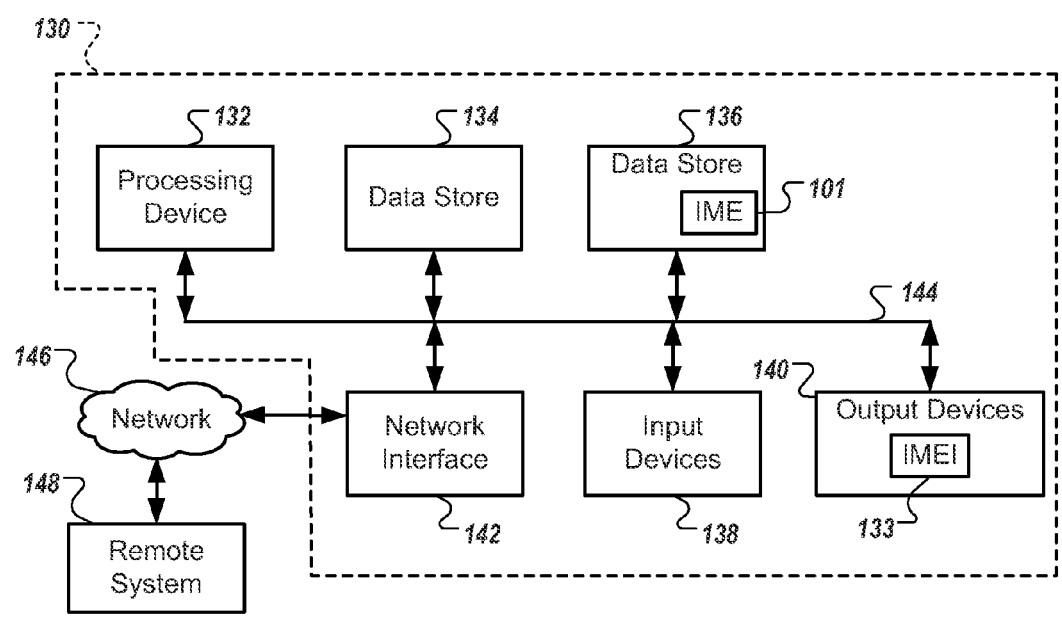
FIG. 1B is a block diagram of an example system that can be used to implement the multi-modal input method editor.

FIG. 1B is a block diagram of an example system 130 that can be used to implement a multi-modal IME. The example system 130 can be implemented, for example, in a computer device, such as a personal computer device, or other electronic devices, such as a mobile phone, mobile communication device, personal digital assistant (PDA), Global Positioning System (GPS) navigation device, and the like.

The example system 130 includes a processing device 132, a first data store 134, a second data store 136, input devices 138, output devices 140, and a network interface 142. A bus system 144, including, for example, a data bus and a motherboard, can be used to establish and control data communication between the components 132, 134, 136, 138, 140 and 142. Other system architectures can also be used.

The processing device 132 can, for example, include one or more microprocessors. The first data store 134 can, for example, include a random access memory storage device, such as a dynamic random access memory, or other types of computer-readable medium memory devices. The second data store 136 can, for example, include one or more hard drives, a flash memory, and/or a read only memory, or other types of computer-readable medium memory devices.

The input devices 138 include at least one input device that is configured to receive spoken input and at least one input device configured to receive written input. Example input devices 138 can include a microphone, keyboard, a mouse, a stylus, etc., and example output devices 140 can include a display device, an audio device, etc. The network interface 142 can, for example, include a wired or wireless network device operable to communicate data to and from a network 146. The network 146 can include one or more local area networks (LANs), a wide area network (WAN), such as the Internet, a wireless network, such as a cellular network, or a combination of all of the above.

In some implementations, the system 130 can include input method editor (IME) code 131 from a data store, such as the data store 136. The input method editor code 131 can be defined by instructions that upon execution cause the processing device 132 to carry out input method editing functions. The input method editor code 131 can, for example, include interpreted instructions, such as script instructions, e.g., JavaScript or ECMAScript instructions, that can be executed in a web browser environment. Other implementations can also be used, e.g., a stand-alone application, an applet, a plug-in module, etc., for use in a user interface, such as a display that displays user inputs received by use of keypad mapping for a mobile device or keyboard mapping for a mobile device or personal computer.

Execution of the input method editor code 131 generates or launches an input method editor instance (IMEI) 133. The input method editor instance 133 facilitates the processing of one or more input methods at the system 130, during which time the system 130 can receive inputs for characters or symbols, such as, for example, spoken or written input. For example, the user can use one or more of the input devices 138, e.g., a microphone for spoken input or a keyboard for written input. In some implementations, the user input can be Roman characters that represent input in a first writing system, e.g., Pinyin, and the input method editor can convert the input to a second writing system, e.g., Hanzi terms. In some examples, a Hanzi term can be composed of more than one Pinyin input.

The first data store 134 and/or the second data store 136 can store an association of inputs. Based on a user input, the input method editor instance 133 can use information in the data store 134 and/or the data store 136 to identify one or more candidate selections represented by the input. In some implementations, if more than one candidate selection is identified, the candidate selections are displayed on an output device 140. For example, if the user input is spoken input, then a list of candidate selections showing written text representations of the spoken input can be presented to the user on the output device 140. In another example, if the user input is Pinyin inputs, the user can select from the candidate selections a Hanzi term, for example, that the user desires to input.

In some implementations, a remote computing system 148 having access to the system 130 can be used to convert spoken user input to written user input. For example, the remote system 148 can be a server that provides a speech recognition service via the network 146. One or more speech utterances forming the spoken input can be transmitted to the remote system 148 over the network 146. The remote system 148 can determine a text conversion of the spoken input, for example, using a convenient form of speech recognizer system, and transmit the text conversion to the system 130. The text conversion can be a best candidate for text corresponding to the spoken input or can be a list of n-best candidate selections for presentation to the user for selection as the input. In an example implementation, the speech recognizer system can include Hidden Markov Modeling (HMM) encoded in a finite state transducer (FST). Other configurations of speech recognizer can be used by the remote system 148.

In some implementations, the remote system 148 can also be used to edit a logographic script. For example, the remote system 148 may be a server that provides logographic script editing capability via the network 146. In one example, a user can edit a logographic script stored in the data store 134 and/or the data store 136 using a remote computing system, e.g., a client computer. The system 130 can, for example, select a character and receive an input from a user over the network interface 142. The processing device 132 can, for example, identify one or more characters adjacent to the selected character, and identify one or more candidate selections based on the received input and the adjacent characters.

The system 130 can transmit a data communication that includes the candidate selections back to the remote computing system.

Figure 1C:
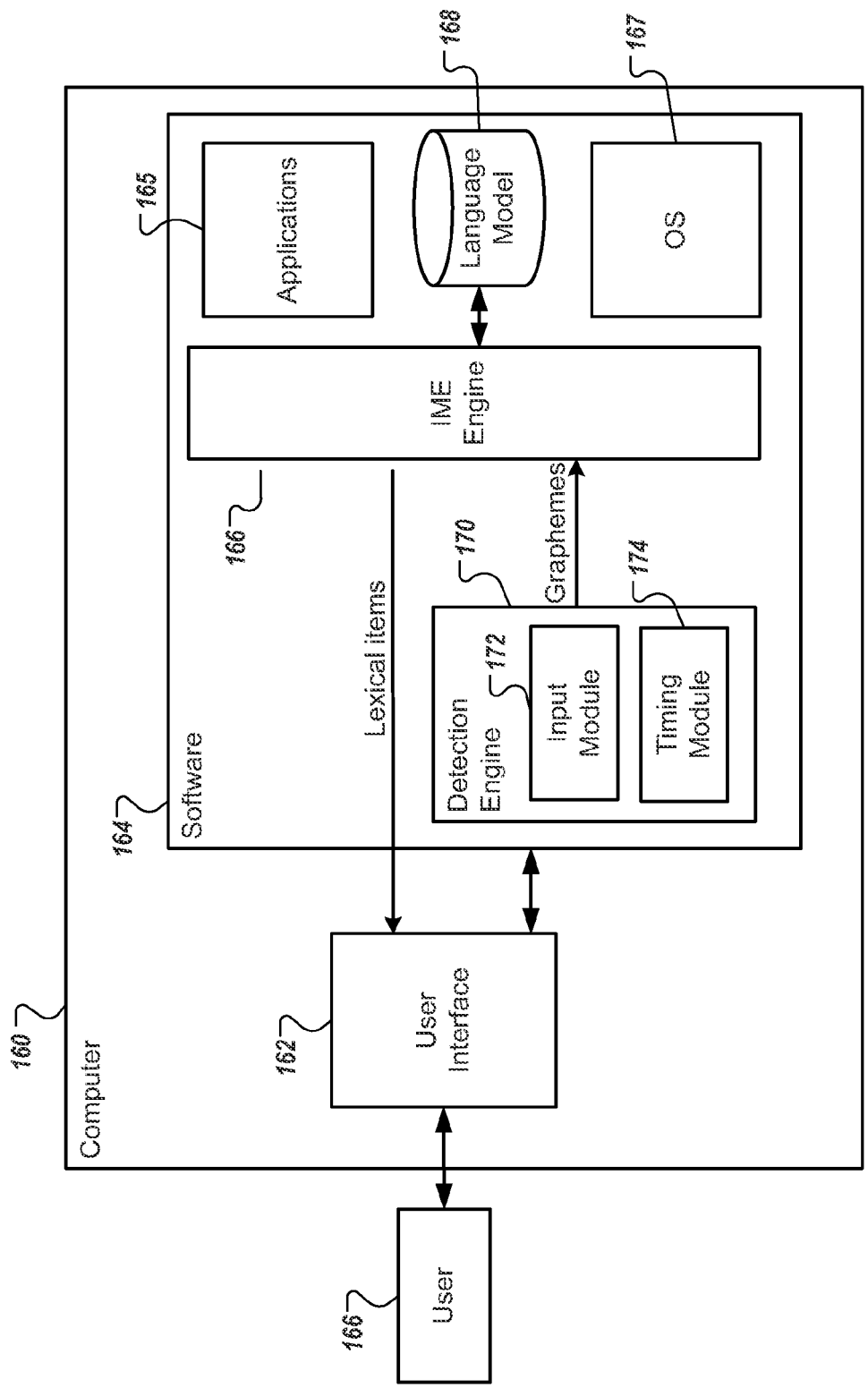
FIG. 1C is a block diagram of example software that can be used to implement the input method editor.

FIG. 1C includes a block diagram of example software that can be used to implement an input method editor in FIG. 1B (e.g., IMEI 133). The system 160 includes a user interface 162 and software 164. A user 166 can access system 160 through the user interface 162. The software 164 includes applications 165, IME engine 166, an operating system (OS) 167, a speech recognition system 169 including a language model 168, and a detection engine 170. The operating system 167 is a particular piece of software that can provide the user interface 162 between the software 164 (e.g., applications 165 and IME engine 166) and the user 166.

As shown in FIG. 1C, the speech recognition system 169 and language model 168 are separate from IME engine 166. In particular, the speech recognition system 169 and language model 168 (which can include two or more language models) are included within software 164 as a separate software component. Other implementations are possible. For example, the speech recognition system 169 and language model 168 can be located remotely (e.g., at the remote system 148 of FIG. 1B). As another example, the speech recognition system 169 and language model 168 can be included within the IME engine 166.

The language model 168 can define one or more language sub-models, each sub-model tailored to a particular application, or webpage, or webform on a particular webpage, or website, to name a few examples. Each language sub-model can, for example, define a particular rule set, e.g., grammar particular to a language, phrase sets, verbals, etc., that can be used to determine a user's likely intent in entering a set of inputs (e.g., inputs for generating candidates that are translations, transliterations, or other types of phonetic representations). In some implementations, each language sub-model can also include a user history of a particular user, e.g., a dictionary of words and phrased often used by a particular user.

The detection engine 170 includes an input module 172 and can include a timing module 174. The input module 172 can, for example, receive input (e.g., keystrokes representing characters or a speech utterance) to particular applications 165 and send the received input to the IME engine 166. In some implementations, the detection engine 170 is a component of the IME engine 166.

The detection engine 170 can detect input and determine whether or not to send the input to the IME engine 166. The IME engine 166 can, for example, be implemented using the input method editor code 131 and associated data stores 134 and 136, and provide output candidates in text converted from speech to an interface (e.g., user interface 162) as the input (e.g., speech utterances) is detected, as described with reference to FIGS. 2 and 3A-E below.

The components of system 160 can be communicatively coupled to one or more of each other. Though the components identified above are described as being separate or distinct form each other, one or more of the components may be combined in a single system, or to perform a single process or routine. The functional description provided herein including separation of responsibility for distinct functions is by way of example. Other storage architectures can also be used. In particular, other groupings or other divisions of functional responsibilities can be made as necessary or in accordance with design preferences. For example, IME engine 166 can perform the functions of detection engine 170. As another example, input module 172 and timing module 174 can be combined into a single module.

Figure 2:
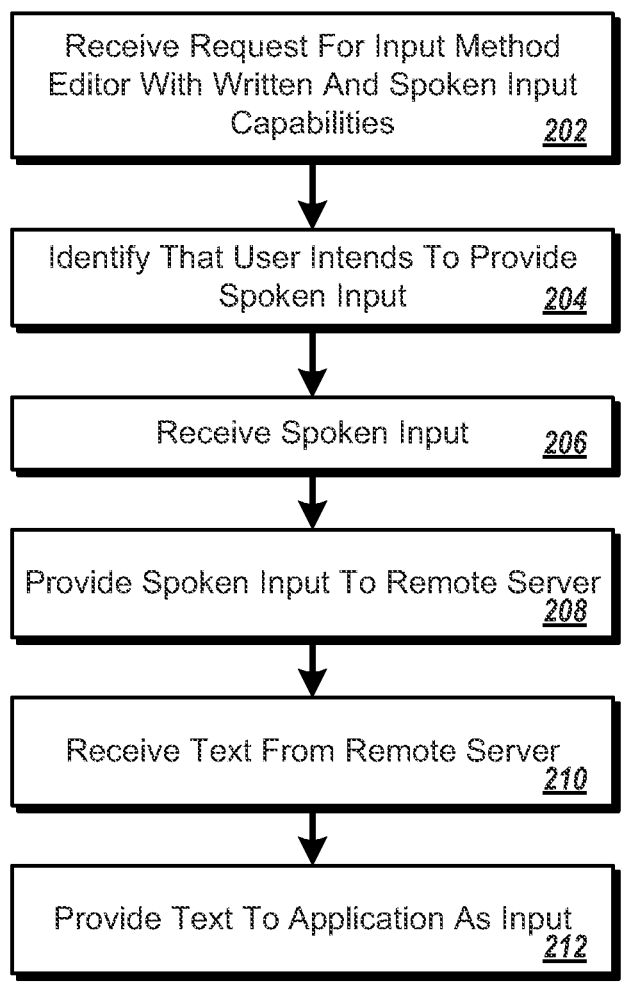
FIG. 2 is a flow chart of an example process for generating text using a multi-modal input method editor.

FIG. 2 is a flowchart of an example process 200 for using an input method editor to receive spoken input from a user input device and to provide written, or textual, input to a corresponding application. A request is received from a user for an application-independent input method editor that has written and spoken input capabilities (Step 202). By way of illustrative example, and without limitation, the request can be received by a mobile electronic device that has a touchscreen keyboard. Example screenshots from such a mobile electronic device are shown in FIGS. 3A-E. These screenshots can be used to illustrate the example process 200; however, it should be understood that other devices can implement the process 200, and the screenshots shown are not intended to be limiting.

Figure 3A:
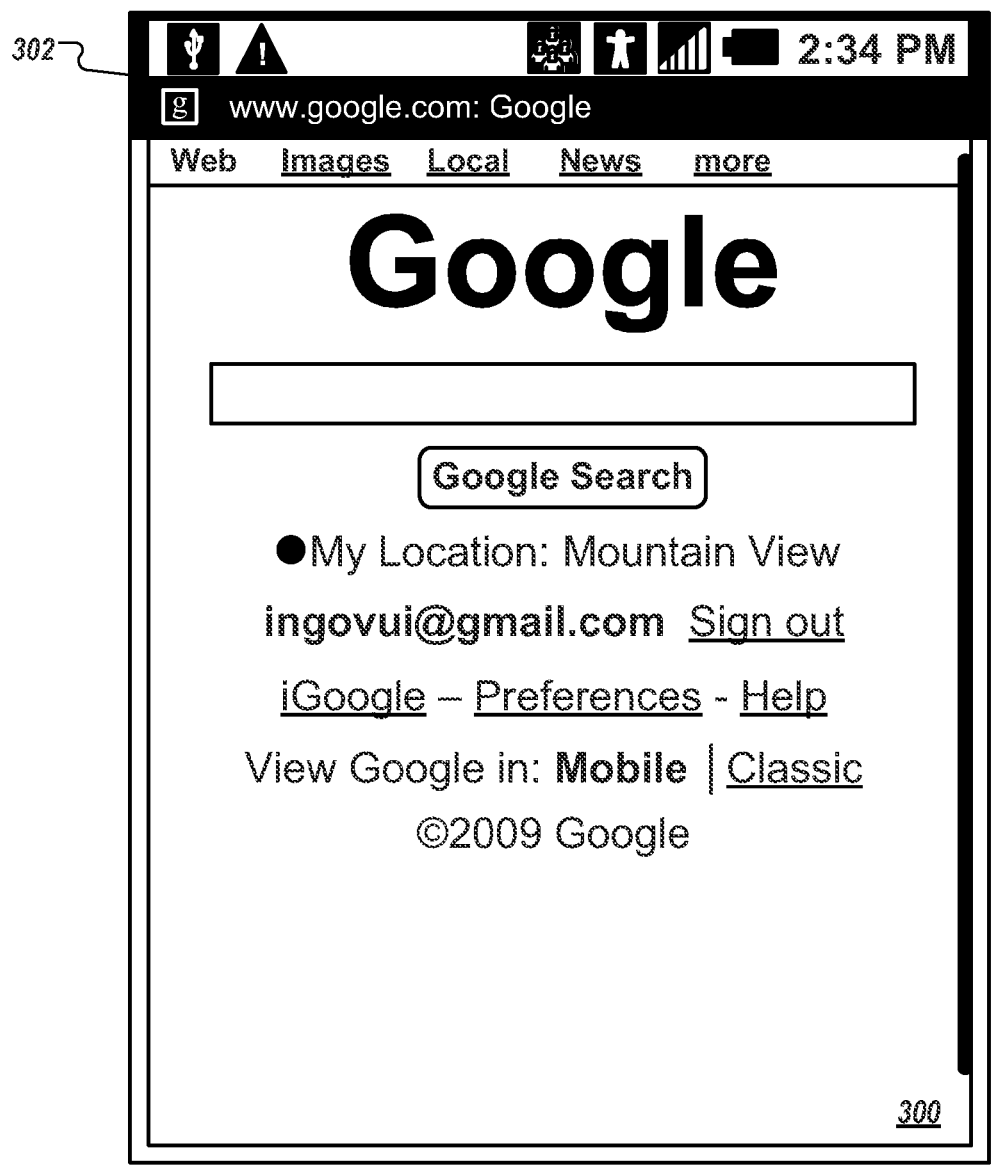
FIGS. 3A-E show example screen shots of an electronic device including a multi-modal input method editor.
Figure 3B:
Figure 3C:
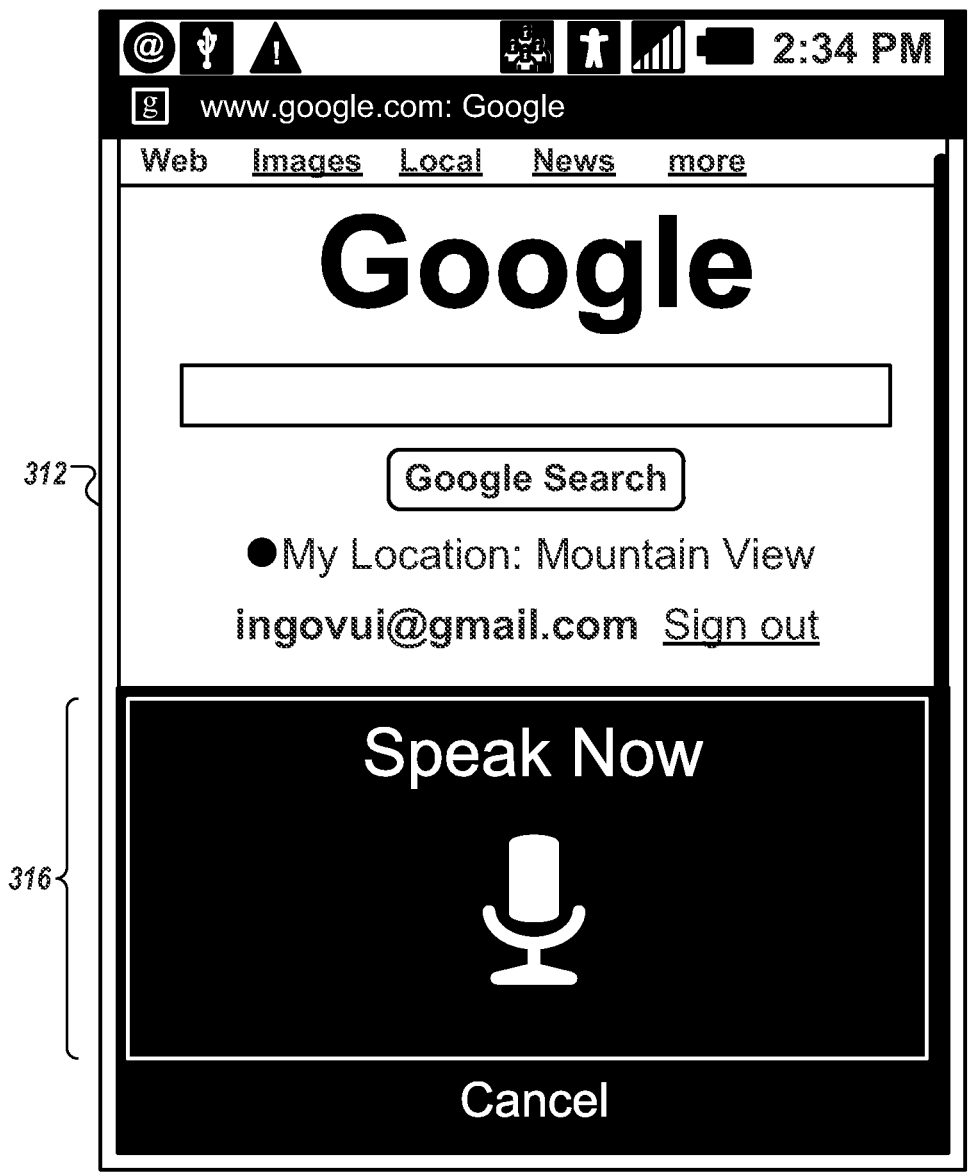
Figure 3D:
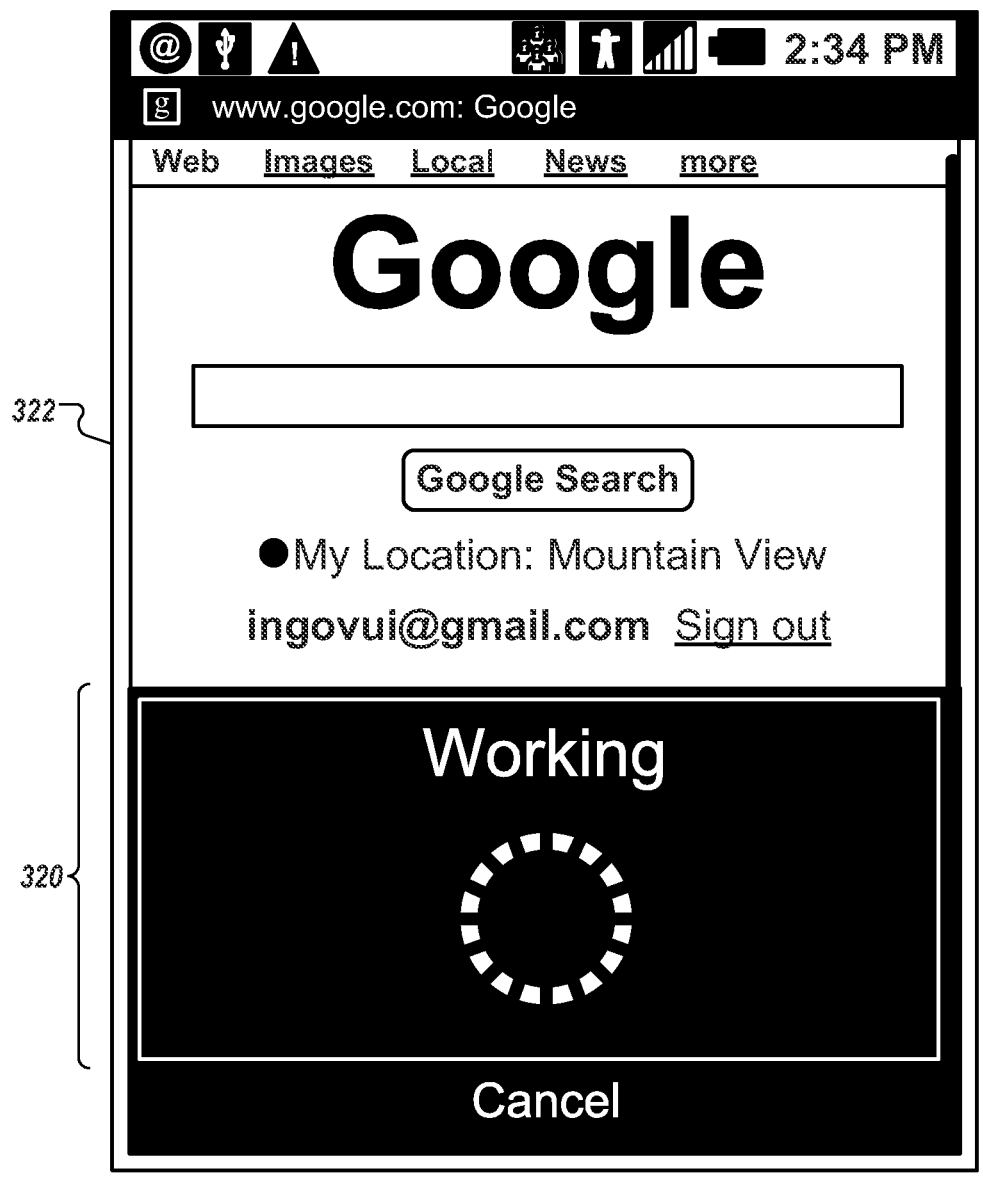
Figure 3E:
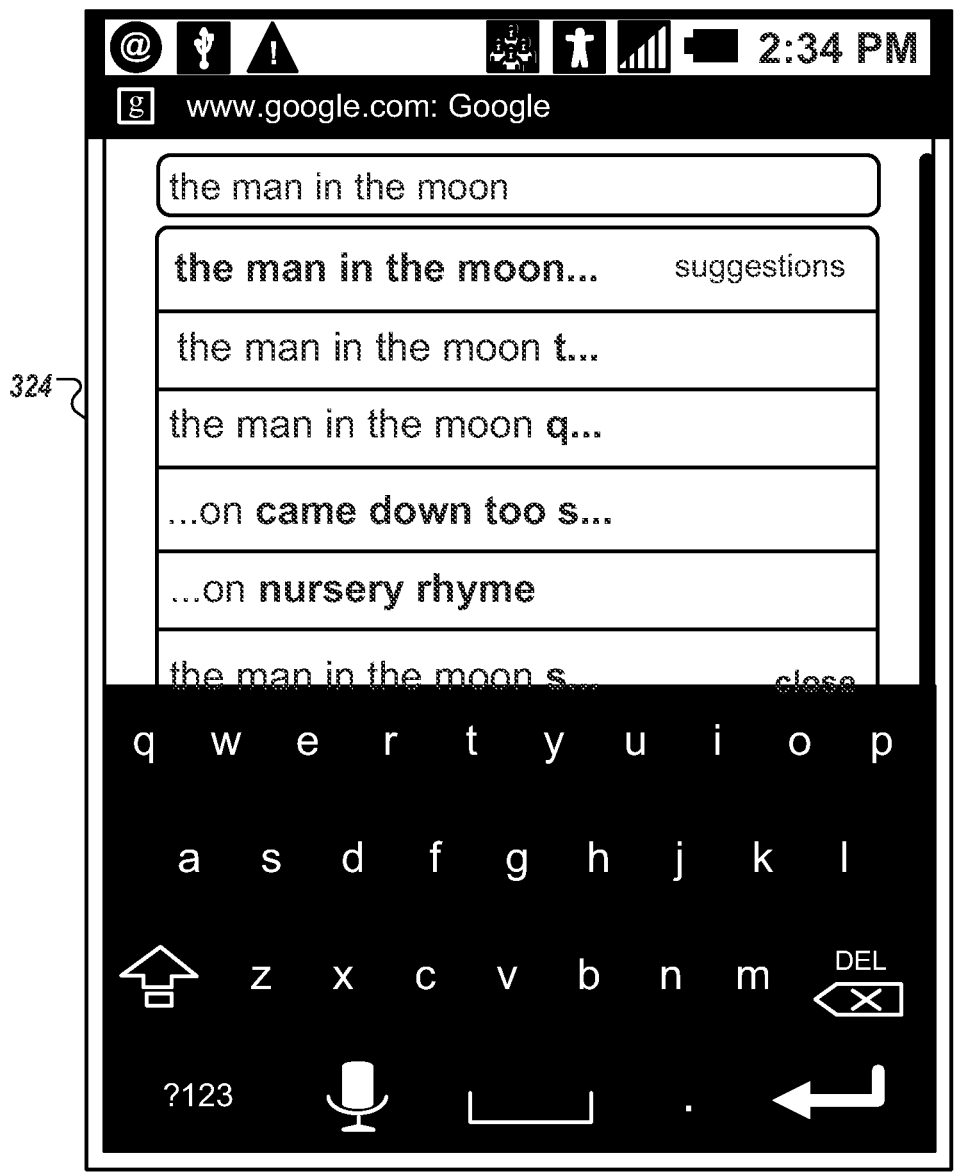

FIG. 3A shows a screenshot 300 where a user has selected to activate a web browser application. Through the web browser application, the user has selected to navigate to the Google search page at the URL www.google.com 302. FIG. 3B shows a screen shot 304 with a soft touchscreen keyboard 306 displayed in a lower portion of the display screen. For example, the user can touch or tap the screen in the search query field 308 to automatically have the keyboard 306 displayed, although other mechanisms can be used to trigger the display of the keyboard 306. The example keyboard 306 shown includes a microphone key 310. An example of a request that can be received from the user includes the user selecting the microphone key 310. Another example includes the user selecting a graphical entity, such as a microphone icon or button, displayed next to or in an input field, e.g., in search query field 308. Another example includes the user swiping his/her finger across the input field, e.g., in a left to right motion, or tapping the input field. Yet another example includes the user picking up the device in a manner that is consistent with raising a microphone included in the device to the proximity of the user's mouth, which can be detected, for example, by an accelerometer reading. Other forms of request can be received from the user for an application-independent input method editor having written and spoken input capabilities, and the above are but some examples.

A user's intention to provide spoken input to the application-independent input method editor is then identified in the process (Step 204). For example, receiving a speech utterance from the user can be used to identify that the user intends to provide spoken input. In other implementations, receiving the request from the user for the input method editor with written and spoken input capabilities can also be used to identify that the user intends to provide spoken input, i.e., the same user action can provide both the request and be used to identify the user's intention. In some implementations, as shown in the screenshot 312 in FIG. 3C, a graphical element can be displayed that prompts the user to speak, such as the microphone graphic 314 and the instructions "Speak now" 316.

A spoken input, i.e., a speech utterance, is then received from the user. The user provides the spoken input as input to an application that is executing on the device (Step 206). The spoken input is provided to a remote server that includes a speech recognition system configured to recognize text based on the spoken input (Step 208). For example, referring again to FIG. 1B, the spoken input can be sent over the network 146 to the remote system 148, where the remote system 148 includes a speech recognition system to recognize text from a speech utterance. Because processing the speech to text conversion can take some time, in some implementations a graphic is displayed to the user to indicate that the process is in progress, such as the "Working" graphic 320 shown in the screenshot 322 in FIG. 3D.

Text is then received from the remote server, where the text represents the spoken input (Step 210). Once the remote server, e.g., remote system 148, has processed the speech utterance, the corresponding text is sent back to the user's device and can be displayed for the user. In some implementations, the best candidate for representation of the speech utterance is selected by the speech recognition system at the remote server and provided to the device. However, in some implementations, an n-best list of candidates can be provided and presented to the user for selection of the correct candidate. For example, referring to FIG. 3E, a screen shot 324 shows a list of suggestions, with the best candidate "the man in the moon" displayed at the top of the list as the default selection.

The text, i.e., the spoken input converted to written input, is then provided to the application as user input (Step 212). That is, once the correct text conversion is selected, if a list of candidates was provided, or once the best candidate has been received, if only one was sent from the remote server, the written input can be passed to the application as the user input for processing by the application.

In some implementations, a context indicator can be sent with the spoken input to the remote system for conversion to text. The remote system can use the context indicator to facilitate the speech-to-text conversion. For example, the context indicator can be used as a basis for selecting an appropriate language model to use by the speech recognition system. The context indicator can specify the context in which the spoken user input was received. For example, the context indicator can specify a name of a field, e.g., in a web form, the name of the application in which the input was received, and/or identify a web page if the user input was received in a web browser application. As another example, the context indicator can include metadata relating to a field in which the user input was received. For example, the metadata can specify that the field requires a one-word answer, or a date, or a name, and the like. In some implementations, the context indicator information can be obtained by the input method editor from the operating system of the electronic device.

The device may pass a sound file (including streaming sound data) of the spoken input to a remote server system, and may take steps to improve the quality of the speech-to-text conversion. As one example, the device may pass information that allows the server system to select a language model that is relatively small in size and is specific to the task that the user is currently facing. For example, when applications register with the IME, they may provide information about fields into which a user can enter information in the applications. The IME can pass such information to the server system, so that the server system may select an appropriate language model. For example, if the cursor is in an "address" field of an application, the IME can pass such information to the server system so that, for example, a user utterance that sounds like "scheet" is interpreted as "street" and not "sweet."

The language model that is applied may also be a composite of, or interpolation of, multiple separate language models. The different models may be relatively small models that have been derived from large data corpuses (e.g., SMS messages and e-mail messages). The models may be prepared off-line by analyzing such corpuses, and the mixture weights that are applied to the models may be generated on-the-fly at run-time, including after data from a particular instance of speech input starts being received from a user. The weightings may be a function, for example, of the field into which a user is currently making an utterance (e.g., the "to" or "from" fields of an email message versus the "body" field of an email message).

The language model may also be chosen more generally, without reference to a particular input field in which the cursor is located. For example, an application developer may register their application with an app store, and may indicate the type of application that it is, such as a music player. Similarly, a server system may have a number of topic-specific language models that it stores. Thus, if a user of a music application speaks the word "Heart" or "Hart" (which would not be plain from the spoken word itself), the IME may pass a "music" indication to the server system, so that the application is passed the word "heart," and the user sees a song list for the female-led rock band. If the media player is a video player, the IME may pass the word "Hart" (assuming there are no great movies or television shows with the word "heart" in their titles) so that the user is shown an index of the episodes of the iconic detective drama "Hart to Hart."

When the user is interacting with a web page, such as in a web browser, different context information can be used for selecting the proper language model. In particular, the domain or a sub-domain for the page may be provided, so that the language model will be specific to the particular type of web site. For example, if the web site is Amazon, then the language model may be one in which "shopping" terms have higher prominence. For example, "product" may have a higher score than "protect" for similar sounds. Such a model may be prepared to be directed to the site itself (e.g., by analyzing input forms on the site, and analyzing text on the site), or on a category that the site matches. Thus, for example, the same language model may be used for the sites Amazon.com, Buy.com, and the like.

Figure 4:
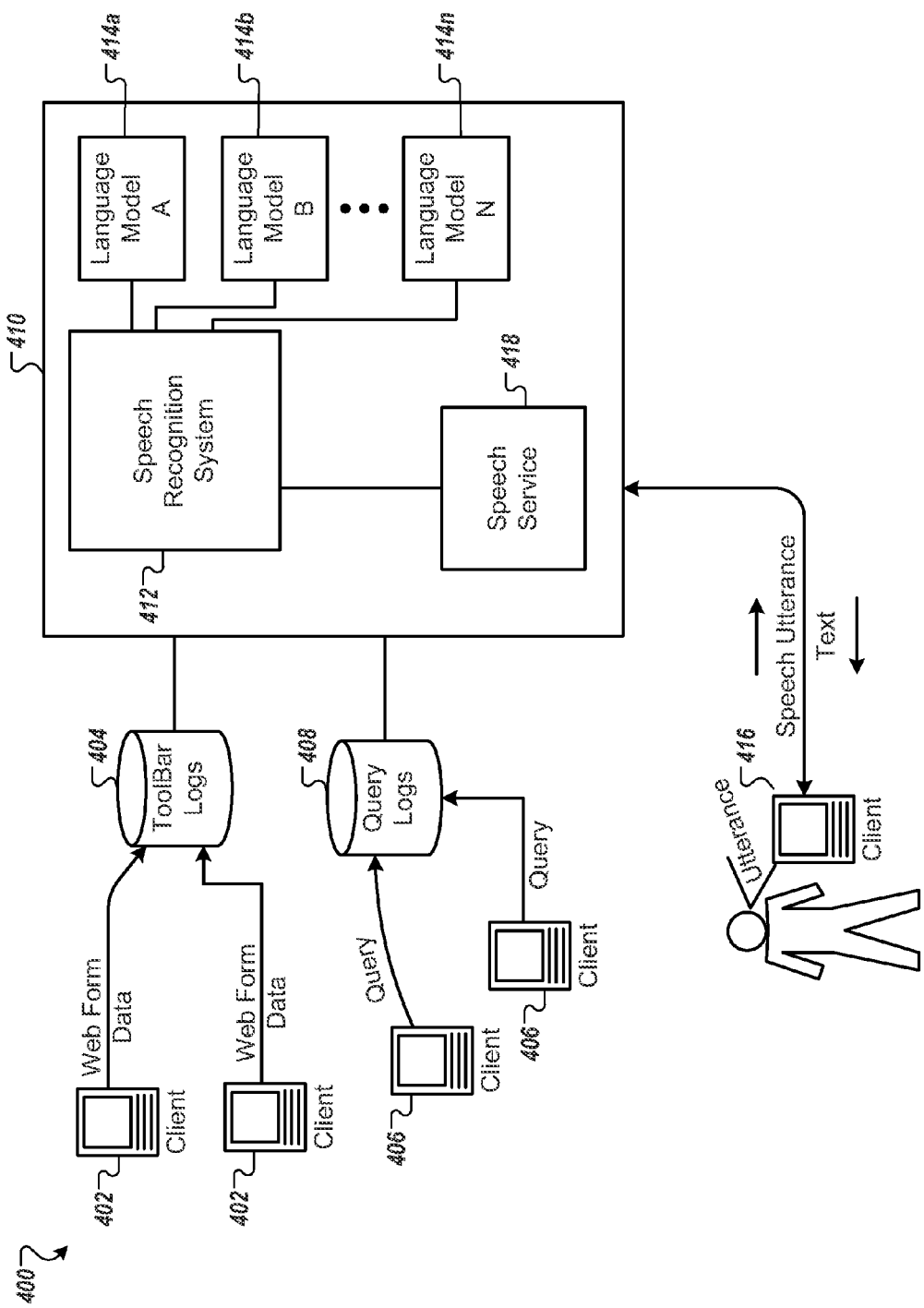
FIG. 4 is a block diagram of an example system for receiving speech input and training language models to interpret the speech input.

FIG. 4 is a block diagram of an example system 400 for receiving speech input and training language models to interpret the speech input. In the system 400, users of client devices enter data into text input fields, and a speech server analyzes that data to determine the type of text the users entered. The speech server builds language models from this information, and uses the language models to recognize speech input associated with similar input fields.

Clients 402, such as computers executing a web browser with an optional toolbar, can receive text input for web forms. When this input is used as part of a process to browse to another page, such as typing in a search field or order form field before pressing a submit button, the text and destination information can be saved in a toolbar log 404. Clients 406, such as computers and mobile computing devices, can receive text based web search queries from users. These queries can be resolved by a web search server (not shown) and the queries and search results can be stored in query logs 408. The client 406 can receive text input to applications, such as an email client, a messaging client, and/or a word processor and spoken input to applications. The text input and transcriptions of spoken input can be stored in input logs 409.

A speech recognition server 410 can retrieve the data in the toolbar logs 404, the query logs 408, and/or the input logs 409. A speech recognition system 412 can group this data into categories or classifications. The speech recognition system 412 creates a series of language models 414a-414n. The language models can contain words, phrases, sentences, etc. from the toolbar logs 404, query logs 408, and/or the input logs 409 based on a particular topic. For example, if the language model A 414a is a language model of British last name, it can contain "Churchill," "Bean," and "Pigou." In another example, if the language model B 414b contains technology-related language, it can contain "object oriented programming," "reverse polish notation," and "garbage in, garbage out."

In some implementations, the speech recognition system 412 can build interpolated language models from the language models 414a-414n. For example, the speech recognition system 412 can use an utterance with a known text result, and poll the language models 414a-414n to determine the confidence level that each language model 414a-414n would associate with the utterance/known text pair. The confidence level returned by each language model 414a-414n can be used by the speech recognition system 412 to create an interpolated language model. For example, using a test utterance and text of "Mr. Bean writes in reverse polish notation," the language model A 414a gives a confidence level of 50%, the language model B 414b give a confidence level of 65%, and the other language models 414c-414n give substantially 0% confidence levels. In this example, the speech recognition system 412 can create an interpolated language model that heavily weighs the language model A and B 414a-b. The particular weightings may be equal to or proportional to the confidence levels, in certain implementations.

A client device 416 can execute an application that accepts text input and can receive an utterance from a user for that text input. The client device 416 can transmit the utterance, along with the context in which the utterance was made or received, to the speech recognition server 410 for translation into text. In some implementations, the context in which an utterance is received is determined by the client device 416 with the field name or label associated with the text input. For example, some applications include metadata for an application input field such as package name, field number or name, and/or attribute flags (e.g. long sentence, email, street address, etc.). In some applications, a text label associated with or displayed near an input box is used to determine the context.

A speech service 418 can receive the utterance and context. In some implementations, the speech service 418 can map the context to broader categories or to the categories of the language models 414a-414n. In some implementations, the speech service 418 can maintain a cache of utterances and resultant texts, and if a received utterance substantially matches a cached utterance, the speech service 418 can return the appropriate cached resultant texts.

The speech recognition system 412 uses or creates an interpolated language model to recognize the text in the utterance. In some implementations, a single candidate text is identified. In some implementations, the top n candidates are identified either wherein all candidates meet a certain confidence threshold, or wherein the top n candidates are selected.

The text or texts identified by the speech recognition system 412 is returned to the client 416, where it is, for example, displayed in a text input field that has focus.

Such context-specific language models may be generated in a variety of ways, including by using search information from a public search engine. For example, bi-grams may be made between search queries and web sites that are highly relevant to those queries (e.g., are in the list of top 10 sites returned to the queries). The queries and sites may then be assigned as nodes in a graph, joined by the relationship between the two. Clusters of such relationships may then be identified, and language models may be generated for those clusters. A particular language model for a web site may then be generated as a weighted combination of the language models for the clusters around the site in the graph.

Figures 5A, 5B:
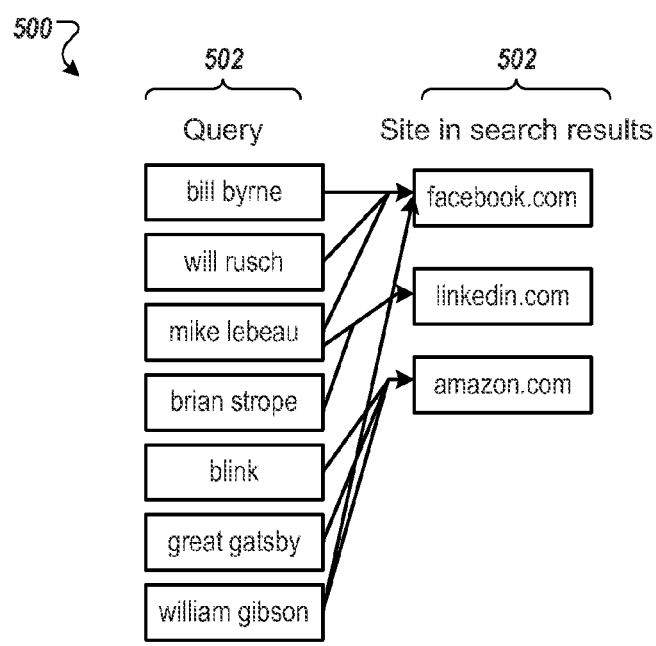
FIG. 5A is a block diagram of queries and associated websites in search results
FIG. 5B is a URL showing search terms in a query

FIG. 5A is a block diagram 500 of queries and associated websites in search results. A group of queries 502 is a collection of example queries that can be collected from a browser executing a toolbar. The queries can be submitted to a web search engine, and a list of search results can be returned. For example, a search for "mike lebeau" can result in search results including facebook.com and linkedin.com. A search for "blink" can result in search results including amazon.com.

The queries and associated websites can be used, for example, in determining a relationship between queries and related topics or categories. In this example, if it is known that facebook.com and linkedin.com are social network websites, it can be determined that the queries "bill byrne," "will rusch," "mike lebeau," and "brian stope" may be the names of people. Similarly, if it is known that amazon.com is a retailer with a reputation as a book retailer, it can be determined that "blink" and "great gatsby" may be the names or titles of retail products, perhaps books. Similarly, if a search for "william gibson" returns links to both facebook.com and amazon.com, it can be determined that "william gibson" may be an author.

FIG. 5B is a URL showing search terms in a query. The URL in this example can be recorded by a web browser executing a toolbar. When a user submits a form via a GET request, the contents of the form can be encoded and logged in the URL parameters. In this example, a search on the webpage facebook.com can generate the URL shown. The name parameter 550, in this example "bill%20byrne", indicates that "bill byrne" was entered into a field in a web form.

Figure 6:
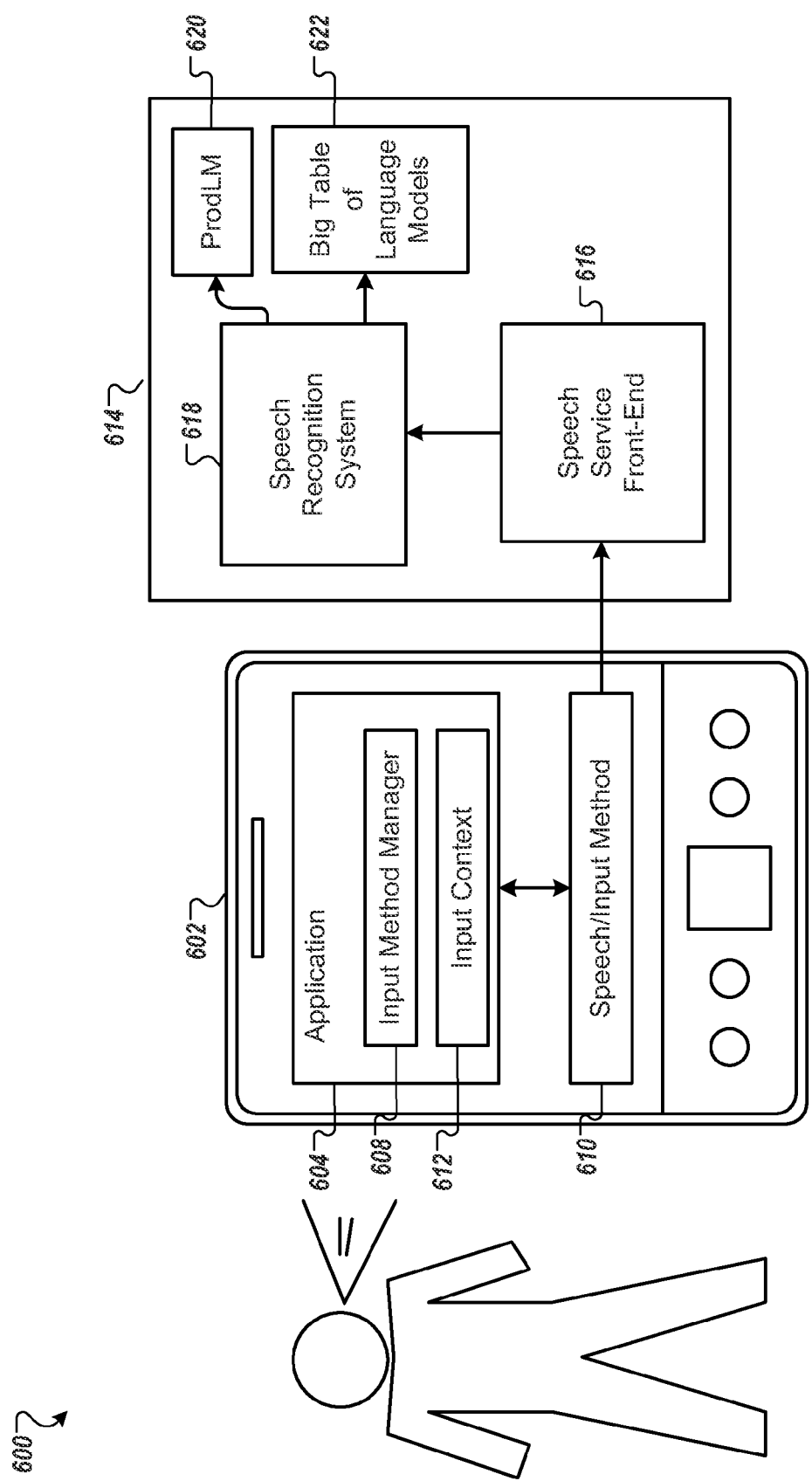
FIG. 6 is a block diagram of an example system for recognizing speech input to a computing device.

FIG. 6 is a block diagram of an example system 600 for recognizing speech input to a computing device. In the system 600, a user enters speech input to an application via an IME. The speech input is analyzed at a speech recognition server and text is returned to the application.

An application 604 executes on a computing device 602, for example a mobile computing device. An input method manager 608 can manage input methods that the application 604 accepts, including speech input from a user. A speech IME 610 in the operating system of the computing device 602 records speech input and collects context data from an input context 612.

Speech IME 610 can transmit the speech input and context to a voice data center 614. A speech service front end 616 can receive the speech input and context and prepare the speech input and context for analysis. For example, statistics can be collected, recognition jobs can be created and sorted, etc. A speech recognition system 618 examines the context, and selects an associated language model from a big table of language models 622. The associated language model in the big table of language models 622 can contain a reference to a language model in a ProdLM 620. The speech recognition system 618 uses the referenced language model in the ProdLM 620 to analyze the speech input and determine a text string. The text string is returned to the speech input method 610, for example by way of the speech service front end 616. The text string can be presented to the user of the computing device 602, and if approved by the user, can be sent to the application 604 as text input.

In some implementations, data obtained from web toolbar logs can be used in determining an interpolated language model. A sample of content of user input (e.g., queries) into a web form can be obtained from web toolbar logs, e.g., in URLs. That is, when a user submits a web form via a GET request, the content of the user input into fields of the web form can be encoded and logged in the URL parameters (e.g., as was described above in reference to FIG. 5B). A toolbar log can therefore provide sample data of what users have input (i.e., typed) into each of the fields of a number of web forms. In some instances, however, the volume of this data may be too sparse to train a good language model for the web form. However, for a particular web form a larger training set can be available if queries of the same category as the queries input into the particular web form are used. That is, queries that correspond to search results having similar websites in the top N search results (where N is an integer, e.g., 10) as each other are probably generally within the same category. To group queries by category, clusters in a search query—search result (website) graph (where queries and websites are assigned to nodes) can be identified, where an edge between a particular query node and a particular website node occurs whenever the website appears in the top N results for the particular query. A language model can then be trained per cluster, that is, language models can be trained for a category (if a cluster is representative of a category of queries).

To generate an interpolated language model for a particular web form (or web site), the interpolated language model can be built using multiple language models formed from a number of clusters. In some implementations, the multiple language models can be selected as follows. A sample of user input into the particular web form (i.e., sample queries) can be obtained, e.g., from a web toolbar log. For example, referring again to FIG. 5B, the sample data may be the query "bill byrne" that is input into a web form on the www.facebook.com website, which is also reflected in the graph shown in FIG. 5A. In this example, "bill byrne" belongs to a cluster that includes people-oriented websites (e.g., facebook.com and linkedin.com) and people names (Bill Byrne, Will Rusch, Mike Lebeau, Brian Strope and William Gibson). In this simple example, the "bill byrne" query belongs to only the people names cluster. However, a query may belong to many clusters. In such instances, for the sample queries obtained from the web toolbar data, the K most significant clusters (K is a number/integer) can be identified and weighted, with the sum of their weights adding to 1.0. In some implementations, the K most significant clusters can be determined by counting the number of sample queries (from the web toolbar log sample data) that fall into each cluster and then optimizing the weights of only the top K clusters. Other techniques to determine the K most significant clusters can be used. The interpolated language model for the web form can be used to convert a speech input received for a field in the form into text. The converted text can be transmitted to an electronic device that initially received the speech input, or transmitted elsewhere, to be used as text input for the field in the web form.

Figure 7A:
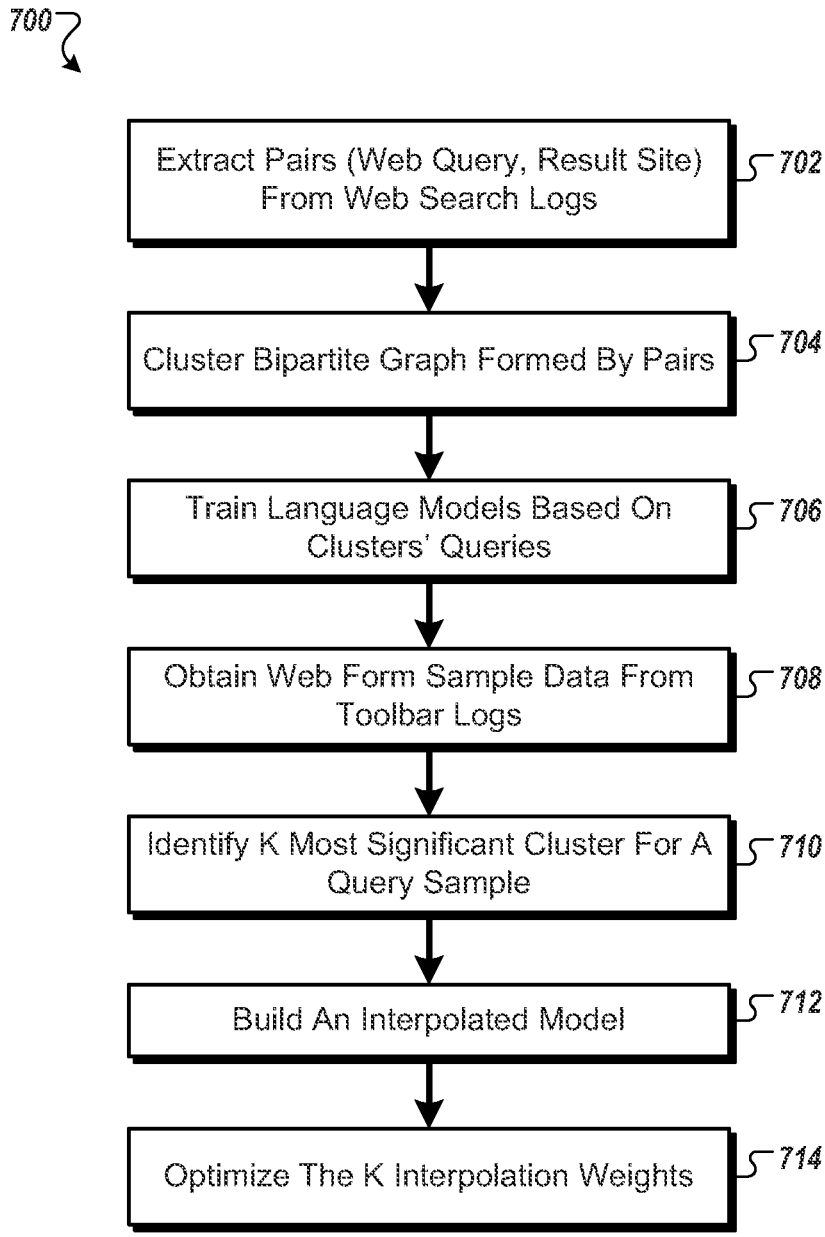
FIGS. 7A and 7B show flowcharts of example processes of building an interpolated language model.

FIG. 7A shows a flowchart of an example process 700 of building an interpolated language model for a website (or a web form of a website). In the process 700, pairs of queries and results are collected, base language models are created, and interpolated language models are created.

In step 702, pairs containing web queries and result sites are extracted from web search logs. For example, a web browser or web browser add on can report queries, query result URLs, or search results to a central repository. In another example, a web search server can create a log of search terms and website domain names that were returned in response to those search terms.

In step 704, a cluster bipartite graph, also known as a bigraph, is formed by the pairs. A bipartite graph is a graph whose vertices can be divided into two disjoint sets such that every edge connects a vertex in the first set to one in the second set. In some implementations, the first set can contain nodes representing queries and the second set can contain nodes representing results. Clusters are identified in the bipartite graph, for example so that each cluster consists of queries and results that may by semantically or syntactically similar.

In step 706, language models are trained based on the queries in the clusters. In some implementations, sample utterances are recorded by a range of speakers and associated with the queries. The utterances for each query can be aggregated, such as by determining an average waveform and a deviation factor indicating how much deviation from the mean was found for most utterances.

In step 708, web form sample data is obtained from toolbar logs, the web form sample data relating to the particular web form (or website) for which the interpolated language model is being generated (e.g., the interpolated language model can be for the web form). In some implementations, a web browser toolbar can record and transmit the URLs of websites visited by the browser. The URLs can include input text (i.e., sample queries) that has been entered into the web form and submitted. This information can be used to associate a particular website domain, or web page with a particular topic or idea.

In step 710, the K most significant clusters for the input text, i.e., the sample queries, obtained from the web form sample data are identified. A list of cluster names is collected and ranked in order of significance or similarity to the data collected in the step 708. A predetermined number (K, in this case) of the most significant clusters are identified. For example, clusters are identified that include the sample queries. To limit the number of clusters to K, i.e., to identify the K most significant, in some implementations, the number of sample queries that fall into each cluster can be counted and the weights assigned to each cluster optimized for only the top K clusters.

In step 712, an interpolated language model for the web form (or website) is built. In one example, a data structure is created that contains links to the K most significant language models. This data structure represents a combined language model that delegates speech recognition functionality to the referenced language models.

In step 714, K interpolation weights are optimized. Each referenced language model can have a weight, such as a percentage, integer in a particular range, or probability, associated with the referenced language model in the interpolated language model. In some implementations, this weight can be determined by testing a known pairs of utterances and text. The pairs can be submitted to the referenced language models, which can return a confidence level representing the likelihood or accuracy of the language model to correctly identify the text in the utterance. The confidence levels, optionally normalized or otherwise converted, can be used as weighting values in the interpolated language model. Thus, reference language models likely to correctly identify text in a particular classification are most heavily weighted.

Although a particular number, type, and order of steps are shown, it will be understood by one skilled in the art that other number, types, and orders are possible. For example, other methods of clustering or graph creation can be used in the step 704. In another example, input field flags and descriptions are obtained in the step 708. In another example, step 702 and step 714 can be combined using a process that builds an interpolation model and interpolation weights in one step.

Figure 7B:
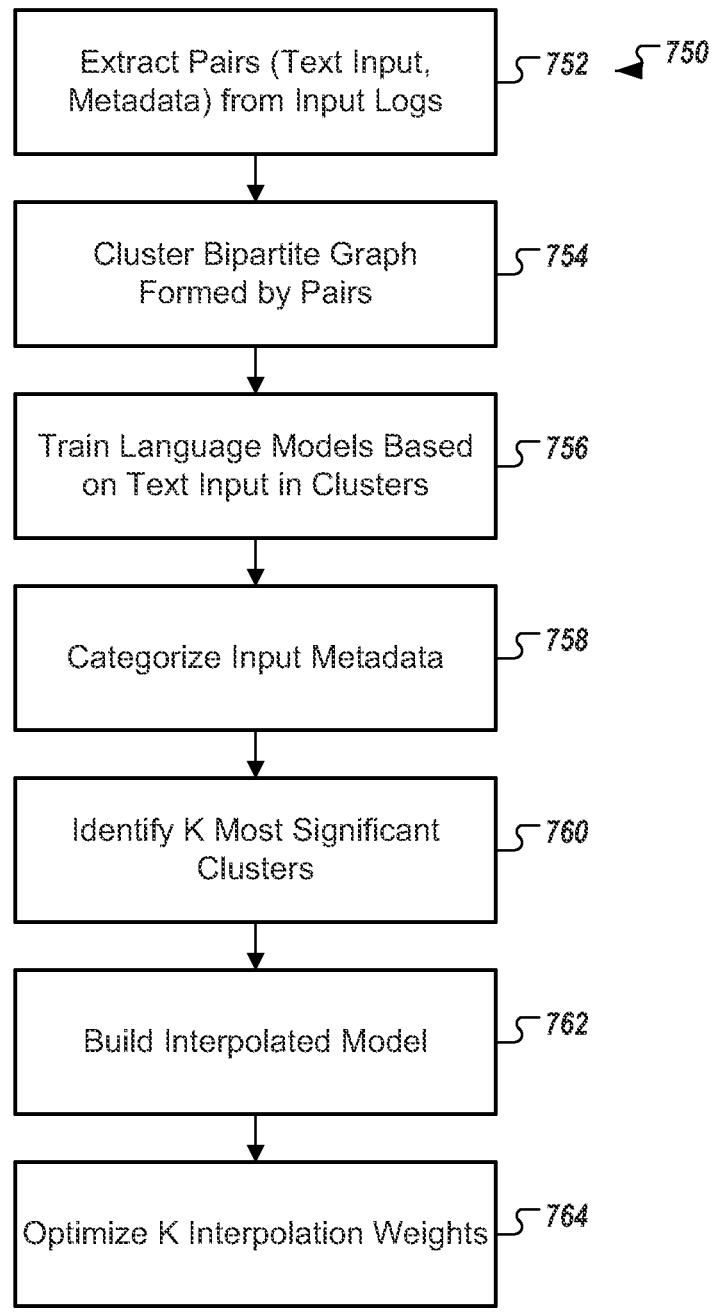

FIG. 7B shows a flowchart of an example process 750 of building an interpolated language model. In the process 750, text input and associated metadata is collected, base language models are created, and interpolated language models are created using the base models and interpolation factors such as weightings to be provided to each of multiple base models.

In step 752, text input and input metadata pairs are extracted from input logs. For example, an application can report to a central repository input entered into an input field and metadata for the input field. In some examples, the text input can include voice input that is transcribed into a text format. In some examples, application wide or operating system wide metadata schemes can define or describe the type of input field, such as an address field, a free form text field, a search field, or a social status field.

In step 754, a cluster bipartite graph, also known as a bigraph, is formed by the pairs. A bipartite graph is a graph whose vertices can be divided into two disjoint sets such that every edge connects a vertex in the first set to one in the second set. In some implementations, the first set can contain nodes representing input metadata and the second set can contain nodes representing text input. Clusters are identified in the bipartite graph, for example so that each cluster consists of similar input metadata.

In step 756, language models are trained based on the text input in the clusters. In some implementations, sample utterances are recorded by a range of speakers and associated with the metadata. The utterances for each text input can be aggregated, such as by determining an average waveform and a deviation factor indicating how much deviation from the mean was found for most utterances.

In step 758, input metadata is categorized. The input metadata can be used to associate a particular input field or application with a particular topic or idea. Example topics or ideas include, but are not limited to, address fields, free form text fields, search field, social status fields, and numeric fields.

In step 760, the K most significant clusters for a category are identified. A list of cluster names is collected and ranked in order of significance or similarity to the data collected in the step 758. A predetermined number (K, in this case) of the most significant clusters are then identified.

In step 762, an interpolated language model is built. In one example, a data structure is created that contains links to the K most significant language models. This data structure represents a combined language model that delegates speech recognition functionality to the referenced language models.

In step 764, K interpolation weights are optimized. Each referenced language model that is referenced in the data structure can have a weight, such as a percentage, integer in a particular range, or probability, associated with it. In some implementations, this weight can be determined by testing a known pair or pairs of utterances and text. The pairs can be submitted to the referenced language models, which can return a confidence level representing the likelihood or accuracy of the language model to correctly identify the text in the utterance. The confidence levels, optionally normalized or otherwise converted, can be used as weighting values in the interpolated language model. Thus, reference language models that are likely to identify text in a particular classification correctly are most heavily weighted.

Although a particular number, type, and order of steps are shown for the process in this figure, it will be understood by one skilled in the art that other number, types, and orders are possible. For example, in step 762 and step 764, a data structure with weighted links to the K most significant language models can be selected from a collection of some or all possible data structures with weighted links to language models.

Figure 8:
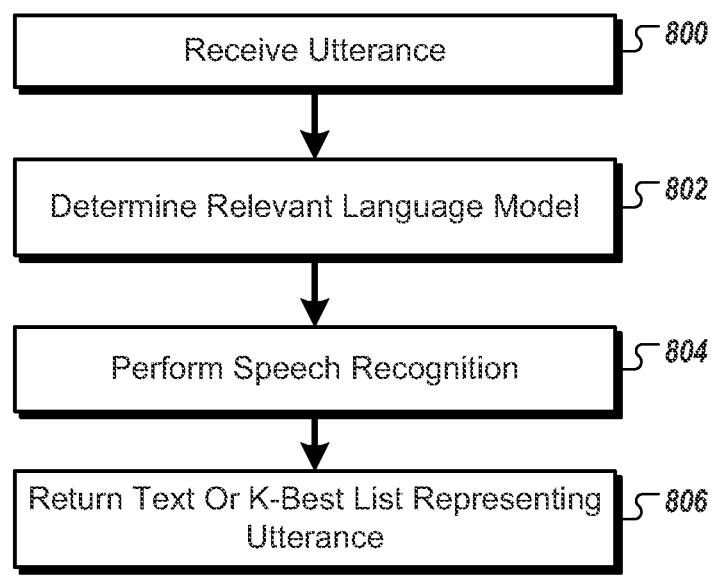
FIG. 8 shows a flowchart of an example process for recognizing text in an utterance.

FIG. 8 shows a flowchart of an example process 800 for recognizing text in an utterance. In the process 800, an utterance is received, the speech in the utterance is recognized, and text, or a list of text options, is returned.

In step 802, an utterance is received. For example, a speech recognition server can receive translation requests from clients. The translation request can include an utterance (e.g. an audio file) and a context (e.g. text or other data describing how the utterance may be used or categorized).

In step 804, a relevant language model is determined. For example, an interpolated language model for web search, free form text input, or social status can be determined. In some implementations, language models, including interpolated language models, can be indexed by keyword, web domain, application type, or other criteria. Using metadata associated with the utterance, such as context or source information, a relevant language model can be determined.

In step 806, speech recognition is performed. The utterance can used by a speech recognition application using the language model. The speech recognition application can calculate one or more candidate text strings from the utterance. A confidence level can be associated with each text string.

In step 808, a K-best list of text strings representing the utterance is returned (where K is an integer). In some implementations, the text string with the highest confidence value is selected and returned. In some implementations, a particular number (K, in this case) of text strings with the highest confidence level are returned.

Although a particular number, type, and order of steps are shown, it will be understood by one skilled in the art that other number, types, and orders are possible. For example, in step 808, all text strings with a confidence level above a particular threshold can be returned. In another example, an utterance can be preprocessed before step 806 to improve recognition.

Figure 9:
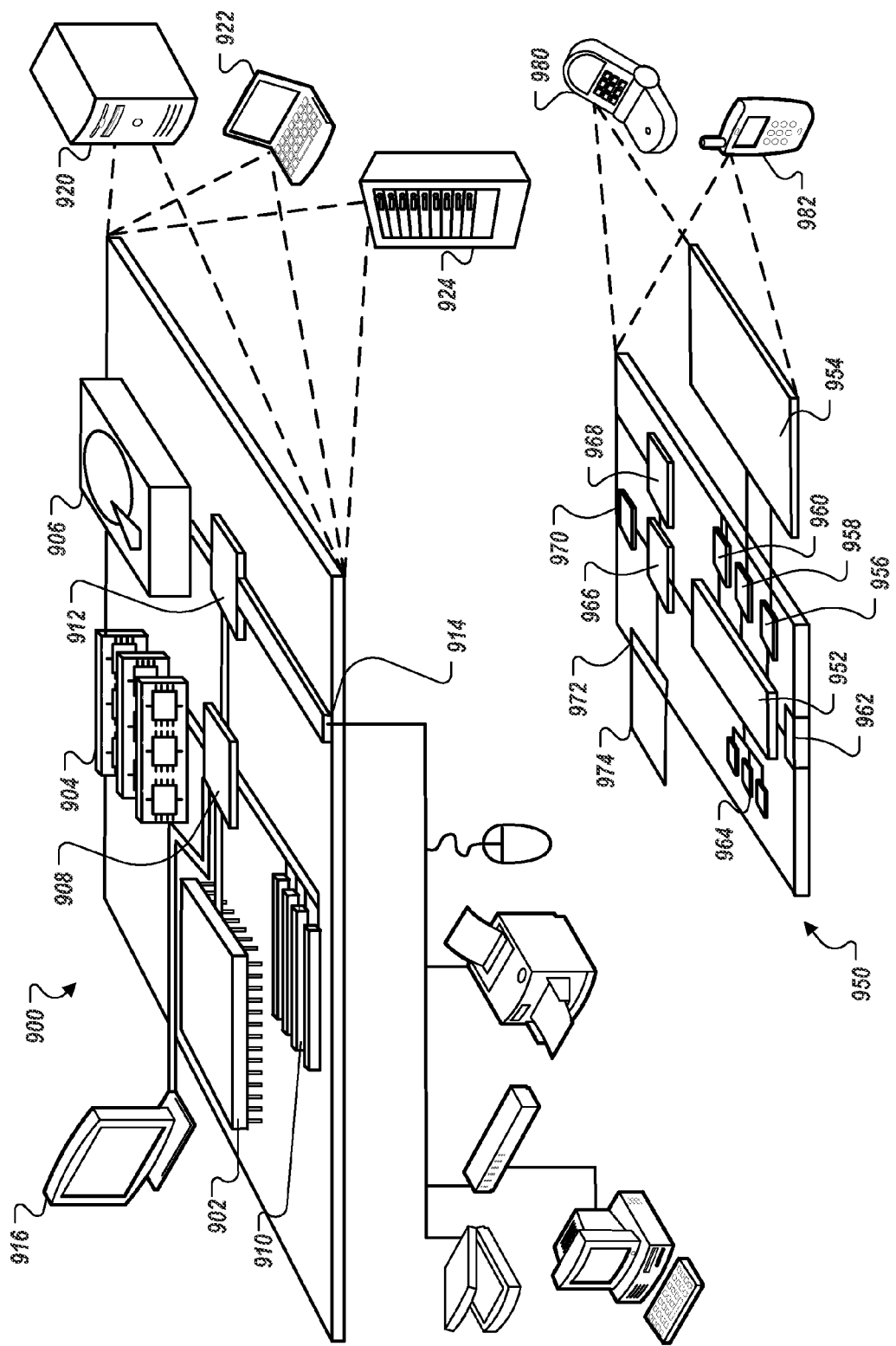
FIG. 9 shows examples of generic computer devices that may be used to execute the actions discussed in this document.

FIG. 9 shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 may process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 904, the storage device 906, memory on processor 902, or a propagated signal.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 may execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 may be implemented as one or more of a computer-readable medium or media, a volatile memory unit or units, or a non-volatile memory unit or units. Expansion memory 974 may also be provided and connected to device 950 through expansion interface 972, which may include, for instance, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Device 950 may also include one or more different devices that are capable of sensing motion. Examples include, but are not limited to, accelerometers and compasses. Accelerometers and compasses, or other devices that are capable of detecting motion or position are available from any number of vendors and may sense motion in a variety of ways. For example, accelerometers may detect changes in acceleration while compasses may detect changes in orientation respective to the magnetic North or South Pole. These changes in motion may be detected by the device 950 and used to update the display of the respective devices 950 according to processes and techniques described herein.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Figure 10:
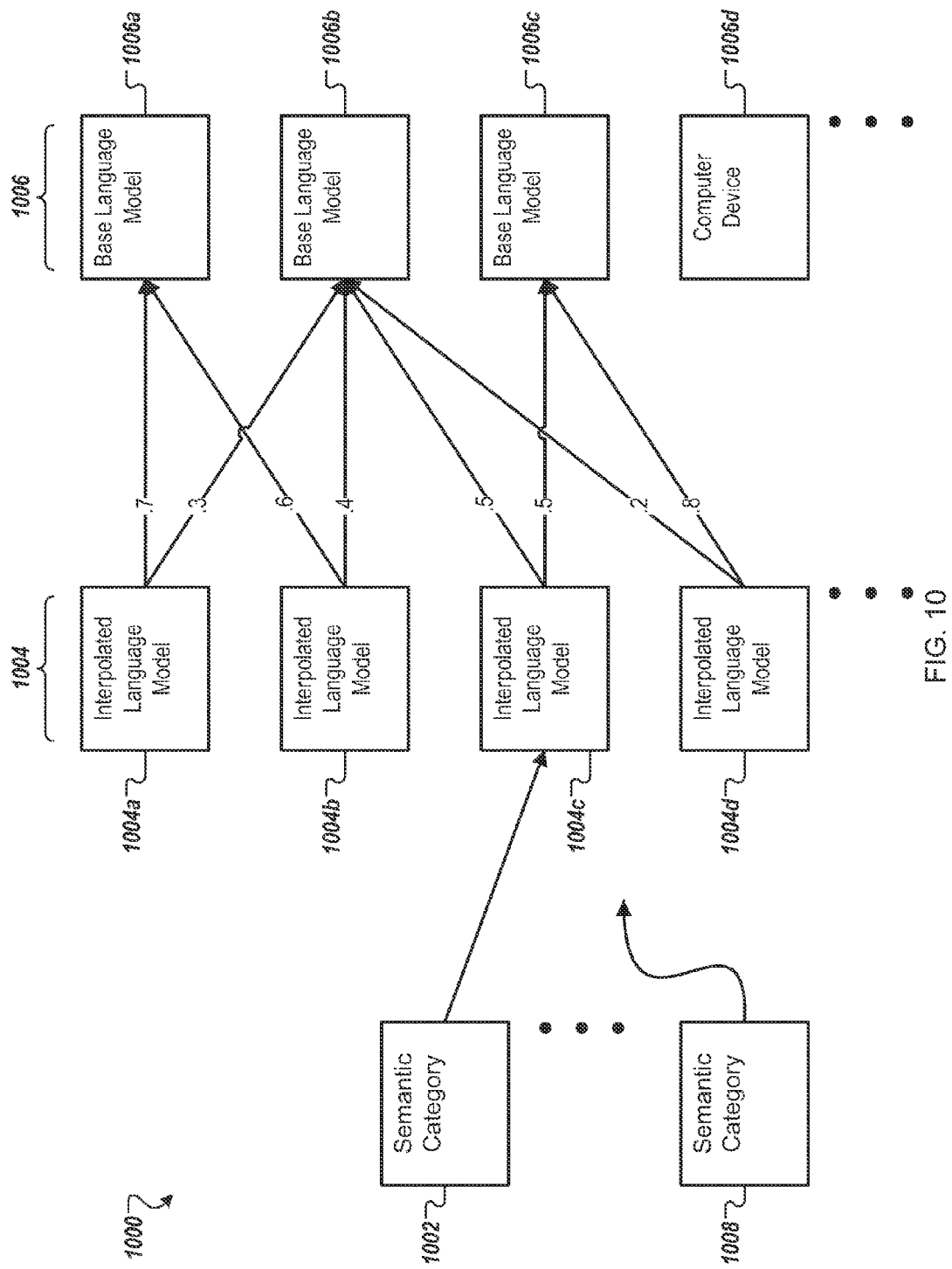
FIG. 10 is a block diagram of an example data structure of a language model.

FIG. 10 is a block diagram of an example data structure 1000 of a language model. The data structure 1000 can weightedly link a semantic idea or category with language models, for example, for use in speech recognition.

A semantic category 1002, such as a search query or type of input field, can be linked to one or more of a collection of interpolated language models 1004. The interpolated language models 1004 can be linked to one or more base language models 1006. The links between the interpolated language models 1004 and base language models 1006 can be weighted. In some examples, the sum of the weights of the links from one interpolated language model can be 1 or can be normalized to 1.

It will be understood that, although a particular number and configuration of interpolated language models 1004, base language models 1006, and links are shown, other numbers and configurations are possible. For example, sufficient interpolated language models 1004 may exist that every weighted combination of base language models 1006 has a linked interpolated language model 1004. In some examples, interpolated language model can be linked to more or fewer base language models 1006. In some examples, different link weights between interpolated language models 1004 and base language models 1006 may exist, such as positive integers, probabilities, or dimensional distance (e.g. W,X,Y,Z values for four dimensional space.) In some implementations, multiple semantic categories 1002 can be linked to a single interpolated language model 1004.

In some examples, interpolated language models 1004 can be created on demand, such as when a semantic category 1002 is added to the data structure. The interpolated language models 1004 can persists after the removal of semantic categories (not shown). For example, previously removed semantic categories (not shown) may have prompted the creation of the interpolated language models 1004a, 1004b, and 1004c. A new semantica category 1008 can be added to the data structure 1004, and linked to any of the interpolated language models 1004.

In some examples, every possible interpolated language model 1004 can be pre-created for use by a new semantic category 1008. Some of these examples can be used in situations, such as when many new semantic categories 1008 are expected, when pre-processing time is available, and/or when few base language models 1006 are expected.

A number of embodiments have been described. Nevertheless, it will be understood that various modifications may be made without departing from the spirit and scope of what is described here.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method of converting speech to text, comprising:
generating a language model by analyzing textual content for a first web page to determine a topic of the first web page, determining other pages determined to be directed to the same topic of the first web page, and analyzing content of queries previously submitted to the other pages determined to be directed to the same topic of the first web page, wherein the queries previously submitted to the other pages include queries submitted to respective search capabilities of at least some of the other pages;
receiving, at a computer server system and from an electronic device, sound information from a user of the electronic device, and a context identifier that indicates a context within which the user provided the sound information;
using the context identifier to select the generated language model from among a plurality of language models;
converting speech in the sound information to text using the selected language model; and
providing the text for use by the electronic device.

2. The method claim 1, wherein the sound information was provided to the electronic device upon identifying that the user selected a selectable virtual control displayed along with a virtual keyboard interface on the electronic device, the user selection having caused the electronic device to begin listening for spoken input using an application programmed to convert user spoken and typed input into text to be provided to other applications on the electronic device, and
wherein an operating system of the electronic device makes available, to the user of the electronic device, the virtual keyboard interface and a mechanism for speaking input for entering data to multiple applications on the electronic device, and provides, to a particular one of the multiple applications determined to represent the context within which the user provided the sound information, text that corresponds to a user input.

3. The method of claim 1, wherein the context identifier identifies a topic for a web page that was being presented by the electronic device when the sound information was input by the user, and
wherein using the context identifier to select the generated language model comprises selecting the generated language model based on a match between the topic identified by the context identifier and the topic of the first web page and the other pages.

4. The method of claim 1, wherein the context identifier identifies a web page that was being presented by the electronic device when the sound information was input by the user, and
wherein using the context identifier to select the generated language model comprises selecting the generated language model based on a match between the web page that was being presented by the electronic device and the first web page or one of the other pages.

5. A method of converting speech to text, comprising:
generating a plurality of language models by analyzing textual content for a web page to determine a topic of the web page, determining other pages determined to be directed to the same topic of the web page, and analyzing textual content of queries previously submitted by a plurality of users to the other pages determined to be directed to the same topic of the web page, wherein the queries previously submitted by the plurality of users to the other pages include queries submitted to respective search capabilities of at least some of the other pages;
receiving, at a computer server system and from an electronic device, sound information spoken by a user of the electronic device, and a context identifier of the web page, wherein the web page was being presented by the electronic device when the sound information was spoken by the user;
selecting, using the context identifier and from among the plurality of language models, a language model appropriate for the context identifier;
converting speech in the sound information to text using the selected language model; and
providing the text for use by the electronic device.

6. The method of claim 5, further comprising selecting the other pages by a clustering analysis on a graph having pages as nodes that are connected to each other by queries for which the other pages are responsive.

7. The method of claim 6, wherein a web page is determined to be responsive to a query if the web page is a top n ranked search result for the query in a set of ranked search results relevant to the query, wherein n is a predetermined integer.

8. A system comprising:
a data processing apparatus; and
storage coupled to the data processing apparatus storing code that when executed by the data processing apparatus causes the data processing apparatus to perform operations comprising:
generating a language model by analyzing textual content for a first web page to determine a topic of the first web page, determining other pages determined to be directed to the same topic of the first web page, and analyzing content of queries previously submitted to the other pages determined to be directed to the same topic of the first web page, wherein the queries previously submitted to the other pages include queries submitted to respective search capabilities of at least some of the other pages;
receiving, at a computer server system and from an electronic device, sound information from a user of the electronic device, and a context identifier that indicates a context within which the user provided the sound information;
using the context identifier to select the generated language model from among a plurality of language models;
converting speech in the sound information to text using the selected language model; and
providing the text for use by the electronic device.

9. The system of claim 8, wherein the context identifier identifies a field of a form in which input on the electronic device is received that corresponds to the sound information.

10. The system of claim 8, wherein the context identifier identifies a web page that was being presented by the electronic device when the sound information was input by the user.

11. The system of claim 8, wherein the sound information was provided to the electronic device upon identifying that the user selected a selectable virtual control displayed along with a virtual keyboard interface on the electronic device, the user selection having caused the electronic device to begin listening for spoken input using an application programmed to convert user spoken and typed input into text to be provided to other applications on the electronic device.

12. The system of claim 11, wherein generating the language model comprises generating the language model by analyzing textual content for queries to which the first web page, and the other pages are responsive.

13. The system of claim 12, wherein determining the other pages comprises selecting other pages that are related to the first web page by a clustering analysis on a graph having pages as nodes that are connected to each other by queries for which the other pages are responsive.

14. The system of claim 13, wherein a web page is determined to be responsive to a query if the web page is a top n ranked search result for the query in a set of ranked search results relevant to the query, wherein n is a predetermined integer.

15. A computer-readable storage device encoded with a computer program product, the computer program product including instructions that, when executed, cause data processing apparatus to perform operations comprising:
generating a language model by analyzing textual content for a first web page to determine a topic of the first web page, determining other pages determined to be directed to the same topic of the first web page, and analyzing content of queries previously submitted to the other pages determined to be directed to the same topic of the first web page, wherein the queries previously submitted to the other pages include queries submitted to respective search capabilities of at least some of the other pages;
receiving, at a computer server system and from an electronic device, sound information from a user of the electronic device, and a context identifier that indicates a context within which the user provided the sound information;
using the context identifier to select the generated language model from among a plurality of language models;
converting speech in the sound information to text using the selected language model; and
providing the text for use by the electronic device.

16. The computer-readable storage device of claim 15, wherein the context identifier identifies a field of a form in which input on the electronic device is received, which input corresponds to the sound information.

17. The computer-readable storage device of claim 15, wherein the context identifier identifies a web page that was being presented by the electronic device when the sound information was input by the user.

18. The computer-readable storage device of claim 15, wherein the sound information was provided to the electronic device upon identifying that the user selected a selectable virtual control displayed along with a virtual keyboard interface on the electronic device, the user selection having caused the electronic device to begin listening for spoken input using an application programmed to convert user spoken and typed input into text to be provided to other applications on the electronic device.

19. The computer-readable storage device of claim 18, wherein generating the language model comprises generating the language model by analyzing textual content for queries to which the first web page, and the other pages are responsive.

20. The computer-readable storage device of claim 19, wherein determining the other pages comprises selecting other pages that are related to the first web page by a clustering analysis on a graph having pages as nodes that are connected to each other by queries for which the other pages are responsive.

21. The computer-readable storage device of claim 20, wherein a web page is determined to be responsive to a query if the web page is a top n ranked search result for the query in a set of ranked search results relevant to the query, wherein n is a predetermined integer.

* * * * *